(12) United States Patent
Rettey et al.

(10) Patent No.: US 9,999,231 B2
(45) Date of Patent: Jun. 19, 2018

(54) DEVICE AND METHOD FOR MAKING AN IRREGULAR DOUGH PRODUCT

(71) Applicant: Schwan's Global Supply Chain, Inc., Marshall, MN (US)

(72) Inventors: David Rettey, Tracy, MN (US); Adam Kronback, Lamberton, MN (US); Gaelle Denais-Kruse, Marshall, MN (US); Robert Mathiowetz, Slayton, MN (US); David Zion Ovadia, Marshall, MN (US); Wayne M. Pafko, Marshall, MN (US)

(73) Assignee: SFC Global Supply Chain, Inc., Marshall, MN (US)

( * ) Notice: Subject to any disclaimer, the term of this patent is extended or adjusted under 35 U.S.C. 154(b) by 81 days.

(21) Appl. No.: 14/550,449

(22) Filed: Nov. 21, 2014

(65) Prior Publication Data
US 2015/0147435 A1     May 28, 2015

Related U.S. Application Data

(60) Provisional application No. 61/909,765, filed on Nov. 27, 2013.

(51) Int. Cl.
*A21D 13/00* (2017.01)
*A21C 11/00* (2006.01)
(Continued)

(52) U.S. Cl.
CPC .......... *A21D 13/007* (2013.01); *A21C 11/02* (2013.01); *A21D 8/06* (2013.01); *A21D 13/41* (2017.01)

(58) Field of Classification Search
CPC ............... A21C 11/006; A21D 13/007
See application file for complete search history.

(56) References Cited

U.S. PATENT DOCUMENTS

| 3,677,769 A | 7/1972 | King |
| 3,880,069 A | 4/1975 | Moline |

(Continued)

FOREIGN PATENT DOCUMENTS

| DE | 196 37 515 C1 | 11/1997 |
| DE | 198 20 055 C1 | 11/1999 |

(Continued)

OTHER PUBLICATIONS

Artisan Pizza Co.—All Natural, Fresh, Homemade, http://web.archive.org/web/20120702214046/http://artisanpizza.com/, downloaded Jul. 13, 2015, (1 page).

(Continued)

*Primary Examiner* — Hamid R Badr
(74) *Attorney, Agent, or Firm* — Merchant & Gould P.C.

(57) ABSTRACT

A press assembly for forming a food product where the press assembly includes a cutting die including a body that extends from a proximal end to a distal end. The proximal end has an irregular shape and a sharp edge configured to cut the food product into the irregular shape. The body has an interior surface surrounding an interior space. The press assembly further includes a pressure plate arranged within the interior space. The pressure plate includes a pressing surface including a first zone and a second zone surrounding and extending from the first zone at a taper angle such that an outer end of the second zone is recessed from an inner end adjacent the first zone. The cutting die and the pressure plate cooperate to press and cut the food product. The food product is also described.

24 Claims, 17 Drawing Sheets

(51) Int. Cl.
    *A21D 8/06*            (2006.01)
    *A21C 11/02*          (2006.01)
    *A21D 13/41*          (2017.01)

(56) References Cited

U.S. PATENT DOCUMENTS

| | | | |
|---|---|---|---|
| 4,271,200 | A | 6/1981 | Hempenius et al. |
| 4,303,677 | A | 12/1981 | De Acetis |
| 4,464,405 | A | 8/1984 | De Christopher |
| 4,551,337 | A | 11/1985 | Schmit et al. |
| 4,606,923 | A | 8/1986 | Ricke |
| 4,696,823 | A | 9/1987 | DeChristopher |
| 4,917,924 | A | 4/1990 | Huang et al. |
| 4,936,686 | A | 6/1990 | DeChristopher |
| 4,996,913 | A | 3/1991 | DeChristopher |
| 5,074,778 | A | 12/1991 | Betts, Jr. et al. |
| 5,176,922 | A * | 1/1993 | Balsano ............ A21C 11/006 100/237 |
| 5,204,125 | A | 4/1993 | Larsen |
| 5,253,565 | A | 10/1993 | Burton |
| 5,260,082 | A | 11/1993 | delValle et al. |
| 5,538,744 | A * | 7/1996 | Miller ............... A21C 11/16 426/138 |
| 5,591,470 | A | 1/1997 | Bartley |
| 5,996,476 | A | 12/1999 | Schultz |
| 6,187,359 | B1 | 2/2001 | Zuccarini |
| 6,227,093 | B1 * | 5/2001 | Rensky, Jr. ......... A21C 11/12 30/293 |
| 6,274,859 | B1 | 8/2001 | Yoshino et al. |
| 6,365,210 | B1 | 4/2002 | Schaible, II et al. |
| 6,990,892 | B2 | 1/2006 | Errera |
| 7,252,491 | B2 | 8/2007 | Errera |
| 7,331,776 | B2 | 2/2008 | Errera |
| 7,592,026 | B2 | 9/2009 | Hartmann et al. |
| 7,677,879 | B1 * | 3/2010 | Craig ............... A21C 11/02 30/305 |
| 8,013,280 | B2 | 9/2011 | Robinson et al. |
| 2003/0003211 | A1 | 1/2003 | Kanafani et al. |
| 2004/0040443 | A1 | 3/2004 | Errera |
| 2004/0040444 | A1 | 3/2004 | Errera |
| 2004/0040445 | A1 | 3/2004 | Errera |
| 2004/0040446 | A1 | 3/2004 | Errera |
| 2004/0146622 | A1 | 7/2004 | Walter et al. |
| 2004/0175477 | A1 * | 9/2004 | Walter ............... A21C 9/04 426/549 |
| 2005/0123659 | A1 * | 6/2005 | Torghele ............ A21C 1/06 426/289 |
| 2005/0150394 | A1 | 7/2005 | Errera |
| 2006/0225579 | A1 | 10/2006 | Errera |
| 2008/0181996 | A1 | 7/2008 | Yother |
| 2009/0162512 | A1 | 6/2009 | Morikawa et al. |
| 2009/0196970 | A1 | 8/2009 | Barrett |
| 2010/0068321 | A1 | 3/2010 | Errera |
| 2010/0266731 | A1 | 10/2010 | Walter et al. |
| 2010/0266736 | A1 | 10/2010 | Walter et al. |
| 2011/0287153 | A1 | 11/2011 | Zimmer |
| 2012/0114812 | A1 | 5/2012 | Lawrence |
| 2012/0185086 | A1 | 7/2012 | Khatchadourian et al. |

FOREIGN PATENT DOCUMENTS

| | | |
|---|---|---|
| GB | 2 205 066 A | 11/1988 |
| WO | 92/20234 A1 | 11/1992 |

OTHER PUBLICATIONS

Artisan Pizza Kitchen—Chapel Hill, NC, http://www.artisanpizzakitchen.com/?reqp=1&reqr=[Jul. 9, 2015 3:29:58 PM] (1 page).

Blue Ribbon Artisan Pizzeria, http://www.blueribbonpizzeria.com, downloaded Aug. 1, 2012 (1 page).

Hartman, "Artisan Dough—How with a High-Tech Twist", Snackfood & Wholesale Bakery, May 2012, vol. 101, No. 05, pp. 22-28.

Hartman, "The Breadmen Cometh", Snackfood & Wholesale Bakery, May 2012, vol. 101, No. 05, pp. 14-20.

Faubion et al., "The Viscoelastic Properties of Wheat Flour Doughs" Edited by Faridi, Ph.D., H. and Faubion, Ph. D., J.M., in Dough Rheology and Baked Product Texture, Published by Van Nostrand Reinhold, New York, New York (1990), pp. 29-51.

Frozen and Refrigerated Doughs and Batters, Edited by Kulp, K.; Lorenz, K. and Brummer, J., American Association of Cereal Chemists, St. Paul, Minnesota, USA pp. 87, 130, 253 (1995).

Herzberg et al., "Pizza and Flatbread are the Fastest Breads we Make: Storing the Dough Makes the Difference", Artisan Pizza and Flatbread in Five Minutes a Day, St. Martin's Press, New York, NY, pp. 1-2 (2011).

Howie's Artisan Pizza, http://howiesartisanpizza.com, downloaded Aug. 1, 2012 (1 page).

Ken's Artisan: pizza, http://www.kensartisan.com/pizza.html, downloaded Aug. 1, 2012 (1 page).

Kenji Lopez-Alt, J. "Domino's New Artisan Pizza: Better Crust, Toppings Still Need Work", http://web.archive.org/web/20141126163009/http://sliceseriouseats.com/archives/2011/10/dominos-artisan-pizza.html, downloaded Jul. 13, 2015 (4 pages).

Menjivar, "Fundamental Aspects of Dough Rheology", Dough Rheology and Baked Product Texture, Edited by Faridi, Ph.D., H. and Faubion, Ph.D., J.M., Published by Van Nostrand Reinhold, New York, New York (1990), pp. 1-9.

Ovadia, "A History of Pizza", Bubbles in Food 2 Novelty, Health and Luxury, Edited by Campbell, G.M., Scanlon M. G. and Pyle, D.L., Eagen Press, St. Paul, Minnesota, USA (2008), Chaper 39, pp. 411-423.

Principles of Cereal, Science and Technology, Second Edition, Edited by Hoseney, R. C., Published by American Association of Cereal Chemists, Inc., St. Paul, Minnesota U.S.A., pp. 238-249.

Qarooni, Flat Bread Technology, pp. 70, 88-92, 168-169, Chapman and Hall, New York, NY (1996).

Sahin et al., "Physical Properties of Foods", Chapter 2, Springer Press, New York, New York 10013 pp. 75-78 (2006).

Shreeves, "What does artisanal mean?" http://www.mnn.com/food/healthy-eating/blogs/what-does-artisanal-mean, downloaded Aug. 1, 2012 (5 pages).

Stear, Handbook of Breadmaking Technology, 1990, pp. 251-254, Elsevier Applied Science, New York, NY.

Van Der Maarel, "Pizza Crust" Baking Science & Technology, Edited by Pyler, E.J. and Gorton, L.A., vol. II, Fourth Edition, Sosland Publishing Company, Kansas City, MO, pp. 234-238, 661-665 (2009).

Wheat End Uses Around the World, Edited by Faridi, H. and Faubion, J.M., American Association of Cereal Chemists, St. Paul, Minnesota, U.S.A., pp. 75, 283, American Association of Cereal Chemists, St. Paul, Minnesota, USA (1995).

* cited by examiner

# DEVICE AND METHOD FOR MAKING AN IRREGULAR DOUGH PRODUCT

CROSS REFERENCE TO RELATED APPLICATION

This application claims priority U.S. Provisional Application Ser. No. 61/909,765 entitled "A DEVICE AND METHOD FOR MAKING AN IRREGULAR DOUGH PRODUCT", filed Nov. 27, 2013, the disclosure of which is hereby incorporated by reference in its entirety.

BACKGROUND

Handmade pizza crusts are not perfectly circular, flat, and smooth-surfaced. The size and distribution of bubbles is markedly less uniform in a handmade pizza crust as compared to a machine-made pizza crust. A handmade crust tends to have less uniform surfaces, distribution of bubbles and bubble sizes, and overall shape. Such handmade crusts lack uniformity because of the random action of hand-facilitated procedural steps that are usually absent from machine-made processes. However, these imperfections present challenges for industrial handling and packaging due to the lack of uniformity of the finished products.

In the past 100 years or so, pizza crusts and breads have been made with the help of mechanical manufacturing techniques, aided by an expanding knowledge of dough science and how to manipulate dough properties to greatest effect to accomplish specific goals. Within the last 50 years, techniques have evolved that can entirely avoid the direct application of human hands. Today, such manufacturing practices are common. In contrast to handmade crust, mechanical manufacturing techniques generally produce pizza crusts that are devoid of variations. Instead, such crusts often have very uniform sizes, thicknesses, shapes, and textures.

Traditional techniques for making a pizza crust involve forming the dough into a crust by hand and these handmade crusts are associated with "artisan pizza", which consumers perceive as being of premium quality and highly desirable. Handmade crust often involves kneading, rolling, knuckling, tossing, or otherwise forming the dough into a desired size, thickness, and shape, before topping the dough with the desired toppings. The manual nature of these techniques creates variations in size, shape, thickness, bubble distribution, texture, and the like, which cause each pizza crust to be unique. Consumers of such pizzas enjoy the variations present in pizzas made by handmade techniques and generally perceive a pizza having a handmade crust as being a premium product.

The desire for artisan pizzas among consumers is strong. Consumer behavior and purchasing habits make it clear that handmade imperfections in shape, size, bubble distribution, structure, and texture of pizza crusts are highly desirable and such crusts are generally perceived by consumers as being associated with a premium product. In contrast to handmade crust, mechanical manufacturing techniques generally produce pizza crusts that lack variation. Instead, such crusts often have very uniform sizes, thicknesses, shapes, and textures. Such crusts are less desirable to consumers and generally have a perception among consumers as being an inferior product. In this regard, the Italian Association of True Neapolitan Pizza of Naples, Italy (Associazione Verace Pizza Napoletana), stipulates that if the crust of a pizza is not handmade, a pizza crust is not pizza at all (David Z. Ovadia, *A History of Pizza* in BUBBLES IN FOOD 2, 39, 411-423 (Grant M. Campbell et al. eds., 2008)). Artisan pizzas, which are associated with handmade quality, are highly desirable to consumers. There are chefs that crisscross the United States teaching audiences how to make "artisan pizza" and publishing books with recipes to help people make their own artisan pizza (see, e.g., Jeff Herzberg & Zoe Francois, ARTISAN PIZZA AND FLATBREAD IN FIVE MINUTES A DAY (2011)).

As consumer demand for pizza products having an artisan appearance continues to grow, it is desirable to employ advanced manufacturing processes to decrease the cost of labor and keep down the subsequent price of end products, making artisan pizzas available to all consumers. For example, metering of dough ingredients into a mixing bowl for batches of 50-2000 lbs, sheeting of dough, making it into certain shapes for pizza crusts (usually circles or squares, sometimes triangles), proofing and baking can be accomplished by purely mechanical means. U.S. Pat. No. 3,880,069, U.S. Pat. No. 6,365,210, and US 2003/0003211 describe pizza crust manufacturing processes but, in these examples, no emphasis is placed upon making the finished product appear artisan or handmade and the finished product has a manufactured appearance. U.S. Pat. No. 7,592,026 describes a process for putting grill marks on a filled bread product. The grill marks are described as uniform, with no attention paid, or techniques devised, to make the pattern less regimented and more randomized to provide a handmade, artisan appearance.

A system and method for advanced manufacturing of a pizza product having an artisan appearance is therefore highly desirable.

SUMMARY

In general terms, this disclosure is directed to a device for making a dough product having handmade characteristics and a method of making a dough product, such as a crust for a pizza, having handmade characteristics which are highly desired by consumers and associated with an "artisan" product. An automated high speed manufacturing process is used to make a pizza crust that has similar characteristics and features of a handmade pizza crust and has an artisan-like appearance that is normally associated with an "artisan" pizza product.

One aspect is a method for making a bread-type dough for a pizza product including forming a bread-type dough sheet; embossing the bread-type dough with a knuckle docking device to create a randomized appearance associated with a handmade product. The knuckle docking device includes a plate having a first surface. The first surface defines mounting apertures therein and a plurality of mounting protrusions coupled within the mounting apertures of the plate. The mounting protrusions extend from the first surface of the plate. The method further includes randomizing the internal structure of the bread-type dough sheet by using a press assembly. The randomization step includes the steps of cutting the bread-type dough sheet into an irregular shape and pressing the bread-type dough sheet within seconds after cutting creating a splash rippling effect in the internal structure of the bread-type dough sheet. The press assembly includes a cutting die to irregularly cut the bread-type dough sheet and a pressure plate arranged relative to the cutting die such that the pressure plate and the cutting die cooperatively function together. The pressure plate and the cutting die together define a gap area that is maintained constant while cutting. The splash rippling effect forces portions of the bread-type dough sheet to flow outward and upward into the gap area where the dough flow is contained by the cutting die. In this way a pizza crust having features of a handmade crust, which include a built-up crust edge and thinner center dough layer, is provided.

Another aspect is a press assembly for forming a food product. The press assembly includes a cutting die including a body that extends from a proximal end to a distal end. The proximal end has an irregular shape and a sharp edge configured to cut the food product into the irregular shape. The body has an interior surface surrounding an interior space. The press assembly further includes a pressure plate arranged within the interior space. The pressure plate includes a pressing surface including a first zone and a second zone surrounding and extending from the first zone at a taper angle such that an outer end of the second zone is recessed from an inner end adjacent the first zone. The cutting die and the pressure plate cooperate to press and cut the food product.

A further aspect is a method of making a sheet dough including formulating the bread-type dough; fermenting the bread-type dough; forming the bread-type dough into sheet form; and proofing the bread-type dough. The method further includes applying random embossing to the bread-type dough using a knuckle docking device. The knuckle docking device is configured and arranged with various lengths and diameters. Cutting the bread-type dough to form an irregular shaped edge using a cutting die. The cutting die has an irregular peripheral cutting pattern to impart irregularity to the bread-type dough. Pressing the bread-type dough using a pressure plate that has an identical irregular peripheral cutting pattern as the cutting die. The pressure plate has a first zone and a second zone to create a dough having a thin center that gradually thickens toward edge of the bread-type dough. Par baking the bread-type dough sets the structure.

DETAILED DESCRIPTION

Figure 1:
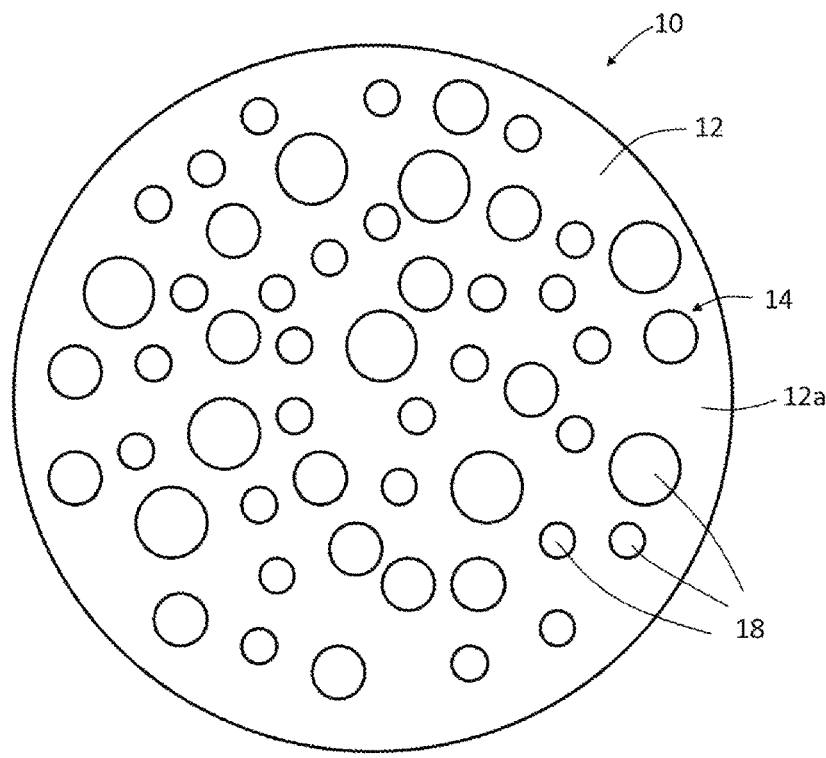
FIG. 1 is top view of an example of a knuckle docking device in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In one aspect, a method of making a dough product, such as a crust for a pizza, having handmade characteristics is disclosed herein. The method generally includes formulating the dough and, if necessary, fermenting the dough. The fermentation can be according to conventional fermenting processes. The dough is formed into individual dough portions or a dough sheet and then proofed.

The dough is then subjected to an embossing step to create an irregular or random appearance on a surface, generally a top surface, of the dough product. The embossing step can include docking the dough with a knuckle-type docker. The docking of the dough is sometimes referred to as "knuckle docking," and this type of docking is intended to mimic manually docking by knuckles and/or fingers, as an artisan type pizza crust would normally be prepared. The knuckle docker can have a random pattern of multiple mechanical "knuckles," such as protrusions or spherical probes, of differing shape, length, and/or diameter and configured in a random array to impart irregular embossing patterns. The knuckle dockers can be structured in multiple ways, for example, knuckle docking plates or knuckle docking rollers.

The internal structure of the embossed dough product is then randomized yet further using a press-type assembly.

The press assembly generally includes a cutting die including a body that extends from a proximal end to a distal end. The proximal end has an irregular shape and a sharp edge configured to cut the dough into the irregular shape, further contributing to the artisan appearance of the dough product. The body has an interior surface surrounding an interior space. The press assembly further includes a pressure plate arranged within the interior space. The pressure plate and the cutting die together define a gap area that is maintained constant while compressing and cutting the dough. The pressure plate generally includes a pressing surface including a first zone and a second zone surrounding and extending from the first zone at a taper angle such that an outer end of the second zone is recessed from an inner end adjacent the first zone.

The cutting die and the pressure plate cooperate to rapidly compress and cut the dough. The rapid compression of the dough by the pressure plate creates a "splash rippling" effect in the internal structure of the dough. The surface of the dough is elastic and the sudden application of pressure to the dough sheet or dough ball creates a rippling effect through the dough that results in the introduction of additional structure stresses within the sheet or ball. The ripple effect is due in part to the viscoelastic properties of the dough, and the air pockets and other irregularities of shape on the dough surface created, in part, by knuckle docking, further contribute to the rippling effect. The splash rippling effect forces portions of the bread-type dough to flow outward and upward into the gap area where the dough flow is contained by the cutting die. In this way a pizza crust having features of a handmade crust, which include a built-up crust edge and thinner center dough layer, is provided.

As used herein, the term "dough" can be a bread-type dough and generally designates a thick viscoelastic fluid made from flour, sugar, water, oil, and/or other commonly used baking ingredients. The dough can contain differing amounts of yeast or chemical leaveners. Dough formulations can be expressed in "baker's percent" which indicates a percentage based on flour, the flour being defined as 100% and each component expressed as a percentage of the flour by weight. One example of a dough formulation includes 100% flour, about 50% to about 65% water, about 1% to about 4% yeast, and about 1% to about 3% salt. Another example of a dough formulation includes 100% flour, about 50% to about 65% water, about 1% to about 4% yeast, about 1% to about 3% salt, about 1% to about 6% oil, and about 0.25% to about 2.0% fiber. Still other dough formulations may include 100% flour, about 50% to about 65% water, about 1% to about 4% yeast, about 1% to about 3% salt, about 1% to about 6% oil, about 0.25% to about 2.0% hydrocolloid, about 0.25% to about 2.0% fiber, about 0.25% to about 3% starch, about 0.01% to about 0.75% reducing agent, and about 0.001% to about 0.25% enzymes.

Manufacturing techniques and other dough formulations are known. See, for example, Ernst J. Pyler & L. A. Gorton, BAKING SCIENCE & TECHNOLOGY 234-238 and 661-665 (2009); Karel Kulp et al., Frozen and Refrigerated Doughs and Batters 87, 130, and 253 (1995); Charles A. Stear, HANDBOOK OF BREADMAKING TECHNOLOGY 251-254 (1990); Jalal Qarooni, FLAT BREAD TECHNOLOGY 70, 88-92, and 168-169 (1996); WHEAT END USES AROUND THE WORLD 70 and 283 (Hamed Faridi & Jon M. Faubion eds., 1995); and David Z. Ovadia, *A History of Pizza*, in BUBBLES IN FOOD 2 411-423 (Grant M. Campbell et al. eds., 2008).

The dough can be of a variety of types. The dough may comprise wheaten dough, yeast leavened dough, bacterially leavened dough, dough leavened with a combination of yeast and bacteria, chemical leavened dough, or unleavened dough. The dough can undergo an aeration process such that enough air is mixed into the dough to provide desirably non-uniform aerated structures in the dough. The dough can also have gaseous structures that allows for good gas retention such that gas bubbles can be moved around without dispersing. In an embodiment, the prepared food product comprises a dough matrix with a plurality of air pockets dispersed therein. In a preferred embodiment, the air pockets are of varying sizes, ranging from sub-millimeter size air pockets to air pockets of up to several centimeters in size.

One example of a dough product is a pizza crust. Although a pizza crust will be used as one example of a dough product to describe the device and method for making a sheet dough in accordance with the principles of the disclosure, it is understood that the device and method for making the sheet dough is suitable for other food products having suitable viscoelastic properties. Examples of other dough-based products include breads, flat breads, pastries, and various other bakery items. Examples of other foods with similar viscoelastic properties include ice cream, soufflé, cheese filled dough, protein foam, chocolate, taffy, and the like. It is appreciated that the processing of such dough products and other foods may be at differing temperature ranges based on viscoelastic properties as functions of temperature.

Examples of pizza types include a thin-crust pizza (approximately 2-10 mm thick) and a thick-crust pizza (approximately 10-40 mm thick). The pizza dough is generally yeast leavened and made from wheat flour, but some thin crust pizza can be cracker like, without yeast, made from comparatively dry dough. Aeration of such crusts may come from rapid expansion of steam in the thinly sheeted dough pieces when baked, in some cases helped by chemical leavening agents, as with crackers, rather than by yeast leavening. In contrast, a thin-crust yeast leavened pizza is generally made from a wetter dough than for a thick crust pizza. Wetter doughs are slack with lower viscosity, allowing them to spread out more easily into a thinner layer to make a thin pizza crust. The dough for a thick crust pizza tends to be lower in moisture, more elastic than viscous and also tends to have a higher viscosity compared to wetter doughs. Dough for a thick crust is generally sheeted thicker and rises higher than thin crusts.

The dough ingredients are generally kneaded or mixed in a mixture until the desired rheological properties of the dough are obtained. The dough should be mixed enough to give the dough workability but not enough so that the shortening effect of the fat (if used) is reduced and the dough becomes too tough. In embodiments, the formed dough mass can be fermented. Doughs that contain yeast are generally fermented before processing the dough mass into a sheet or individual portions, such as balls. In certain examples, the fermentation process can take from about 5 minutes to about 24 hours at a temperature range from about 40° F. to about 110° F. In this example, the relative humidity can range from about 40% to about 90% under the fermentation conditions. It is understood that the time, temperature and relative humidity may vary with other embodiments.

After a dough mass is formed, it can be formed into individual portions of dough suitable for processing as described herein or sheeted. The dough sheet generally has dimensions of about 0.1-1.0 inches (about 0.25-2.5 cm) in thickness and about 25-40 inches (about 60 to 110 cm) in width, but the dimensions of the dough sheet can be adjusted as desired. In an embodiment, the dough is extruded under pressure through a die which roughly controls the width and thickness of the sheet. After extrusion the sheet is passed through one or more rollers or other sheeting apparatus which can control the thickness and width of the dough sheet. Prior to docking the individual dough portions or sheet, the dough is generally proofed. In certain examples, the proofing can take from about 5 minutes to about 60 minutes at a temperature range from about 50° F. to about 120° F. In this example, the relative humidity can range from about 50% to about 90% under the proofing conditions. It is understood that the time, temperature, and relative humidity conditions may vary with other embodiments. The temperature of the dough itself after proofing is between approximately 70° F. and 115° F., more commonly, between 80° F. and 90° F.

According to an embodiment, the dough sheet or portions of it is embossed to yield an embossed pattern. The embossed pattern can either be formed in the proofed dough sheet or the unembossed dough sheet can be cut into shaped sections, proofed, and the embossed pattern can then be formed in the proofed, shaped section. The embossed pattern is generally formed by a knuckle docking device, such as a knuckle docking plate or knuckle docking roller.

Figure 2:
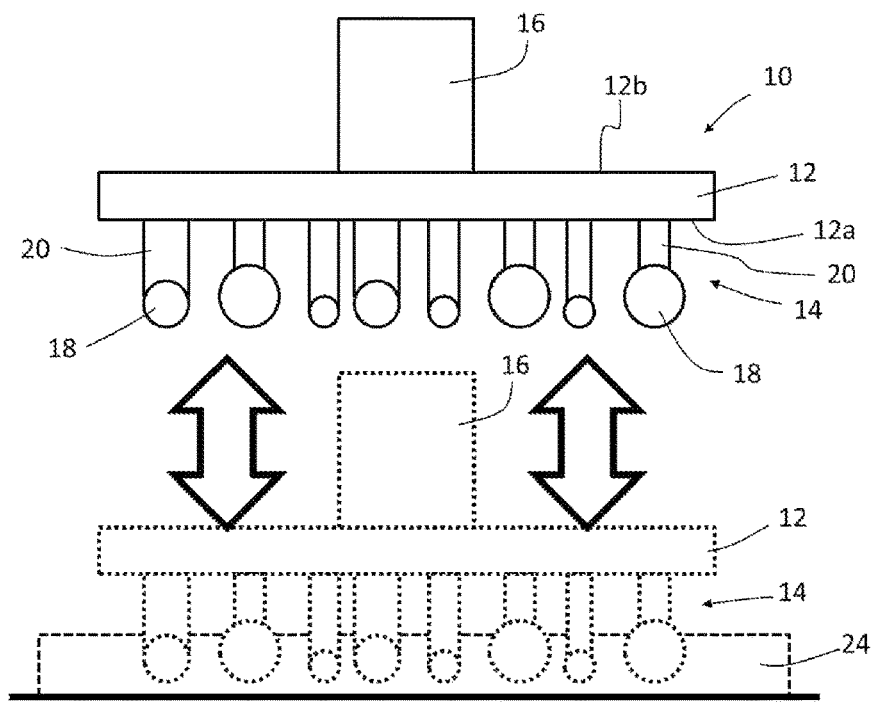
FIG. 2 is side view of the knuckle docking device shown in FIG. 1 and the action of engaging sheeted dough.

Referring to FIGS. 1-2, bottom and side views of an example of a knuckle docking device 10 are depicted. In this example, the knuckle docking device 10 includes a plate 12, a plurality of knuckles 14 (e.g., mounting protrusions), and a handle 16 (see FIG. 2). In the present example, the plurality of knuckles 14 each include a projecting element 18 and a post 20 such that each of the projecting elements 18 are configured as being attached to the posts 20 (see FIG. 2). In this example, the projecting elements 18 are illustrated as spheres. It is appreciated that the projecting elements 18 may be configured or shaped according to various conventional geometries such as, but not limited to, squares, triangles, ovals, rectangles, polygons, or irregular or "natural" shapes. In other examples, the projecting elements 18 can be configured as fingers tips or "thumbs" to create an impression on the dough surface that mimics handmade kneading. The knuckle docking device 10 can help provide an irregular pattern in the dough surface to yield a premium crust product associated with an "artisan pizza."

The knuckle docking device 10 can be a press type device that is used to stamp out pieces of dough. The knuckle docking device 10 can be pressed into the dough to allow the projecting elements 18 to create impressions thereon. It is understood that other types of knuckle docking devices can be used, for example, but not limited to, a rotating roller device. In one example, knuckle docking device 10 is constructed of food grade materials, such as food grade stainless steel, or alternately food grade plastic, such as PVC.

The plate 12 is shown as a circular plate for illustrative purposes. The plate 12, however, can be any shape or size, such as a square, circle, rectangle, or oval, as is commonly used for knuckle docking. The plate 12 includes a first surface 12a and a second surface 12b (see FIG. 2). When the knuckle docking device 10 is used to stamp or emboss the dough, the first surface 12a of the plate 12 faces the dough. The first surface 12a of the plate 12 can define a plurality of internally threaded apertures 22 for receiving the posts 20 therein. Alternatively, the plate 12 may comprise threaded protrusions that correspond to internal threads on the posts 20. In an alternative embodiment, the projecting element is mounted directly onto the plate 12 without the use of posts 20.

Referring to FIG. 2, the plurality of knuckles 14 can form any number of patterns as a result of the randomized placement of the mechanical "knuckles" of the knuckle docking device 10 in sheeted or balled dough 24. The plurality of knuckles 14 are a series of finger-like protuberances of various diameters and lengths threaded at apertures 22 or otherwise secured to the plate 12 to depend therefrom. The plurality of knuckles 14 forms impressions or embossings 26 in the sheeted or balled dough 24 but leaves rising portions therebetween in which gases remain entrapped. The technique of knuckle docking creates a dough product that varies in shape, size, bubble distribution, texture, and thickness. Each dough product formed can be unique and generally resembles an artisan pizza crust.

The placement of the knuckle docking device 10 is such that no two sheet or ball doughs 24 are alike. The impressions applied by the knuckle docking device 10 on the dough will appear randomly placed. Another level of randomness is introduced by applying the knuckle docking device at a pressure that is not constant. The spheres 18 of the knuckle docking device 10 can be configured to have different diameters. In one example, the spheres 18 can be configured to have a uniform diameter. In other examples, the spheres 18 can have various shapes, such as, square, rectangle, triangle, or other shapes, as is commonly used for knuckle docking. The positioning of the projecting elements 18 can also vary, thereby forming multiple types of patterns.

The posts 20 of the plurality of knuckles 14 can be adapted to mechanically secure to the plate 12 of the knuckle docking device 10 by a coupling mechanism. In one embodiment the coupling mechanism comprises apertures defined by the first surface 12a of the plate 12 and corresponding threading at one end of the posts. The posts 20 can be secured (e.g. threaded) within the apertures 22. In some other embodiments, the coupling mechanism may comprise threaded protrusions extending from the first surface 12a and corresponding inside threads on the posts 20, or any other suitable mechanism, such as a snap fit mechanism. In yet another embodiment, the coupling mechanism comprises an adjustable mechanism that can be adjusted manually (e.g., to provide different length posts) or automatically. Alternatively, the posts 20 can be permanently fixed onto the first surface 12a, for example, by welding. In the present example, the posts 20 are configured and arranged with various lengths and diameters. The different lengths of the posts 20 can help to distribute random patterns in the sheet or balled dough 24 and provide the unique shape and bubble distribution most associated with an artisan pizza crust. In the exemplary embodiment, the posts 20 can be changed mechanically by unthreading the posts 20 from the apertures 22. The posts 20 can be rethreaded or secured in the apertures 22.

Figure 3:
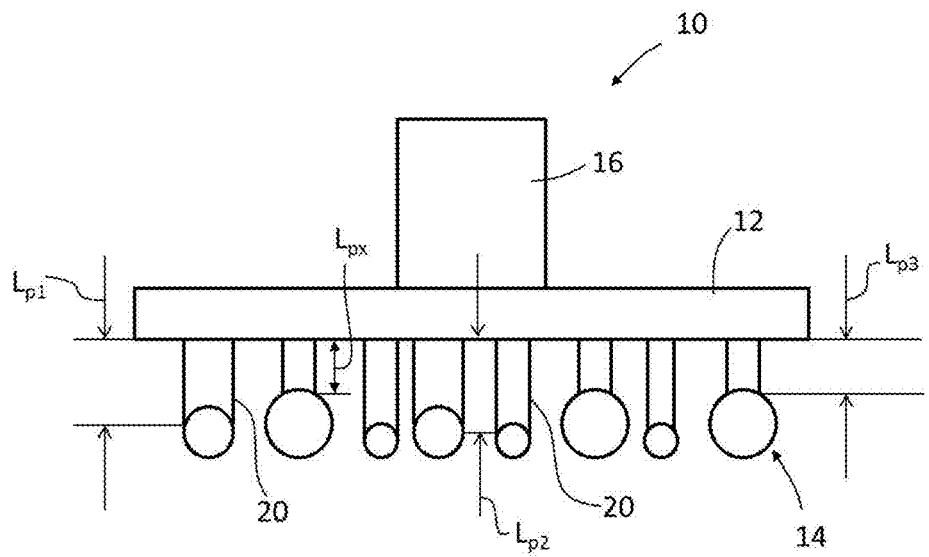
FIG. 3 is a side view of the knuckle docking device shown in FIG. 2 without the action of engaging the sheeted dough.

Referring to FIG. 3, the length $L_{px}$ of each of the posts 20 can vary independently one with respect to the other to further enhance the random appearance of the impressions or embossings in the sheeted or balled dough. In certain examples, the length $L_{px}$ of each of the posts 20 can vary to provide multiple impressions at varying depths which can enhance the random appearance in the sheet or balled dough 24. In the depicted example, the posts 20 each have a respective length $L_{p1}$, $L_{p2}$, $L_{p3}$ that can vary independently of one another. In one example, the length $L_{px}$ of the posts 20 can be configured to vary continuously such that the length $L_{px}$ is dynamically changing all of the time. The posts 20 can be arranged and configured to move in a generally vertical direction or up and down relative to the plate 12. In one example, the posts 20 can be driven using conventional methods (e.g. hydraulic piston) to automatically drive the posts 20 up and down. The vertical position of the posts 20 relative to the plate 12 determines the depth of the embossings introduced into the sheet or balled dough 24. The length $L_{px}$ of the posts 20 may be changed in a variety of manners, the most expedient being the use of the posts 20 of different sizes thereby increasing randomness in the dough. In some examples, springs or elastomers (e.g. rubber plugs) may be used to vary the length $L_{px}$ of the posts 20. Each post 20 can be spring loaded or rubberized such that different resistances and/or tolerances are achieved.

In other examples, the posts 20 can vary in width to impart variations in size, shape, bubble distribution, texture, and the like to create an artisan pizza crust having characteristics of a handmade crust. The knuckle docking device 10 can include posts 20 that are both narrow and wide to impart irregularity in the sheet or balled dough 24 to form an artisan pizza crust.

The handle 16 can be integrated with or coupled to the plate 12 of the knuckle docking device 10. The handle 16 projects from the second surface 12b (e.g., the top surface) of the plate 12. In the present example, the handle 16 is shown positioned centered on the plate 12. In other examples, there can be two handles 16 positioned on opposite sides of the plate 12. The handles 16 can help lift and position the knuckle docking device 10 for docking the sheet or ball dough 24. In certain examples, the knuckle docking device 10 does not include the handle 16. The knuckle docking device 10 can be arranged and configured in high speed manufacturing processes and can be driven hydraulically in a conventional manner to imprint the sheet or ball dough 24. Docking of the sheet or ball dough 24 is illustrated and described in more detail with reference to FIG. 3.

Figure 4:
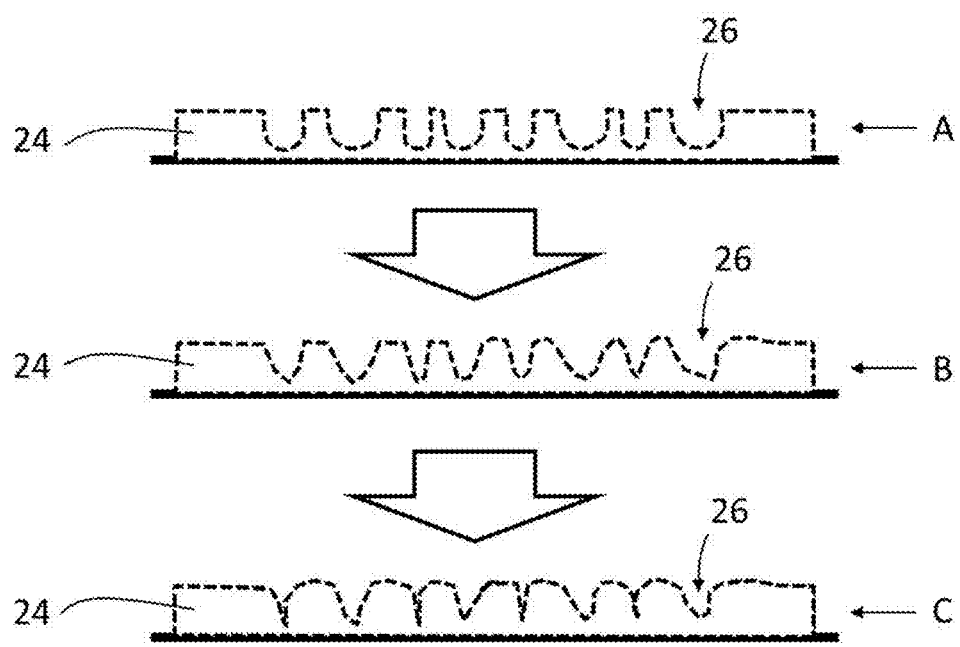
FIG. 4 is a cross sectional view of the sheeted dough shown in FIG. 2 after knuckle docking undergoing metamorphosis.

Referring to FIG. 4, the sheet or ball dough 24 is depicted after knuckle docking. The sheet or ball dough 24 shows how the initial imprint "A" of the knuckle docking device 10 is not static but metamorphoses with time, creating a randomized pattern of indentations "C" in the sheeted dough 24. The variations in size, shape, thickness, bubble distribution, texture, and the like, helps create a pizza crust that is unique and resembles a handmade premium product.

The metamorphosis state can be caused by fluid flow and continued gaseous expansion in the sheet or ball dough 24. Over time, the sheet or ball dough 24 partially rebounds due to its viscoelastic behavior. In certain examples, the sheet or ball dough 24 can relax for up to about twenty minutes. The sheet or ball dough 24 can have a random shape or surface due to the impressions or embossings 26 by the knuckles 14 that can impart a unique artisan pizza crust similar to handmade pizza. The initial imprint "A" or surface of the sheet or ball dough 24 will change as the material metamorphoses as shown at "B" and further at "C" due to the fluidity of the sheet or ball dough 24 that allows it to flow. Because the sheet or ball dough 24 is mass produced, many different flow resistances can occur, as no one dough is the same as another. The randomized pattern of indentations "C" will differ structurally from crust to crust due to the flow characteristics of each sheet or ball dough 24 after docking.

Figure 5:
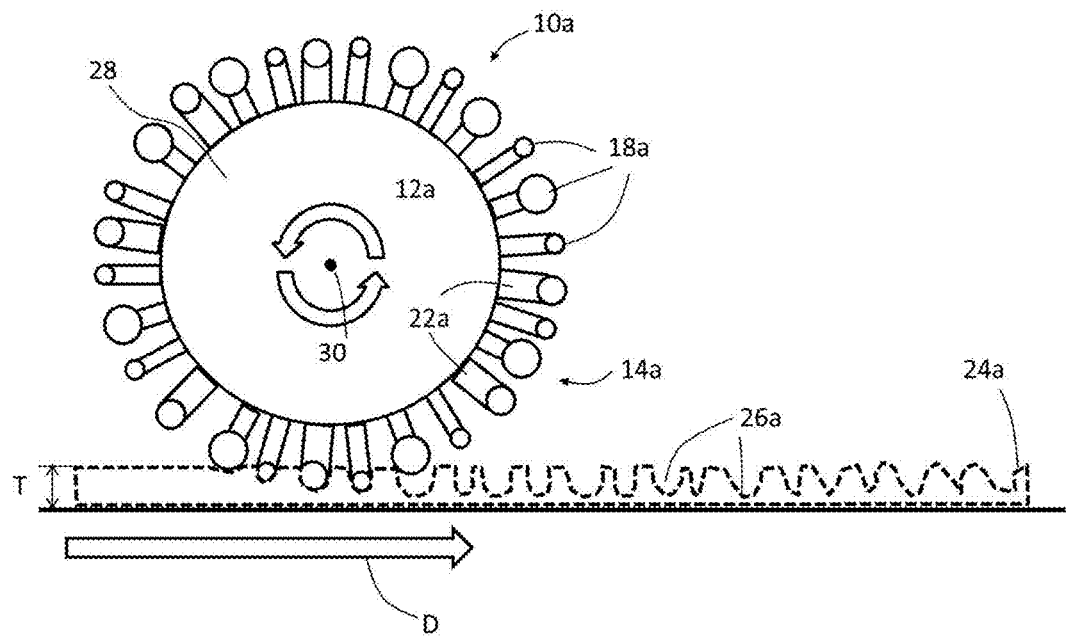
FIG. 5 is a cross sectional side view of another knuckle docking device engaging sheeted dough in accordance with the principles of the present disclosure.

It will be appreciated that other types of knuckle docking devices can be used to create randomized impressions or embossings in dough. For example, FIG. 5 shows an alternative knuckle docking device 10a that can be used to create the same type of randomized impressions or embossings 26 described with respect to the knuckle docking device 10. Many of the possible aspects and features of the knuckle docking device 10 discussed above are applicable to the knuckle docking device 10a described below as well.

Referring to FIG. 5, the knuckle docking device 10a is a rotating cylindrical roller device, not a press. The knuckle docking device 10a includes a drum 28 having a cylindrical shape. The drum 28 of the knuckle docking device 10a includes a plurality of knuckles 14a each having posts 20a and projecting elements 18a (e.g., spheres). The posts 20a can include a threaded portion sized to engage corresponding threaded apertures 22a in drum 28. The posts 20a can be integrated with or coupled to the drum 28 of the knuckle docking device 10a. Various means may be used to install the posts 20a into the drum 28, and are already known in the relevant art. The shape, size and position of the knuckles 14a can vary as described above with reference to the knuckles 14.

In the present example, the drum 28 can be arranged and configured with randomized knuckles 14a to create randomized docking impressions or embossings 26a in a sheet or ball dough 24a using randomized placement and different knuckle diameters. As the sheet or ball dough 24 progresses along a conveyor (not shown) in direction D, the knuckle docking device 10a rotates freely about axis 30. The knuckle docking device 10a rolls across the surface of the sheet or ball dough 24 applying pressure and forming the randomized impressions or embossings 26a.

As seen in FIG. 5, a plurality of knuckles 14a are interspersed at predetermined locations along the drum 28. The position of these knuckles 14a can vary in other embodiments according to the needs of the user. In other examples, the positioning of the drum 28 can vary during mass production of the crust. For example, the drum 28 can be raised or lowered such that the distance of the drum in relation to the sheet or ball dough 24a is not constant and the depth of the impressions or embossings 26a can vary in the dough. Varying the location of the drum 28 inherently changes the depth in which the knuckles 14a can emboss/imprint the sheet or ball dough 24a. The knuckle docking device 10a is constructed of food grade materials, such as food grade stainless steel, or alternately food grade plastic, such as PVC. In other embodiments, the knuckle docking device 10a can be rubberized to change the surface characteristics of the crust.

While knuckle docking provides a non-uniform pattern of depression and protuberances in the vertical section of the sheet or ball dough 24a, the outer shape or perimeter of the pizza crust can also be provided with an irregular shape similar to a handmade pizza crust. To help provide an irregular, random outer shape or perimeter of the sheet dough, a cutting die structured to impart an irregular, randomized outer shape or perimeter of the pizza crust can be utilized.

Figure 6:
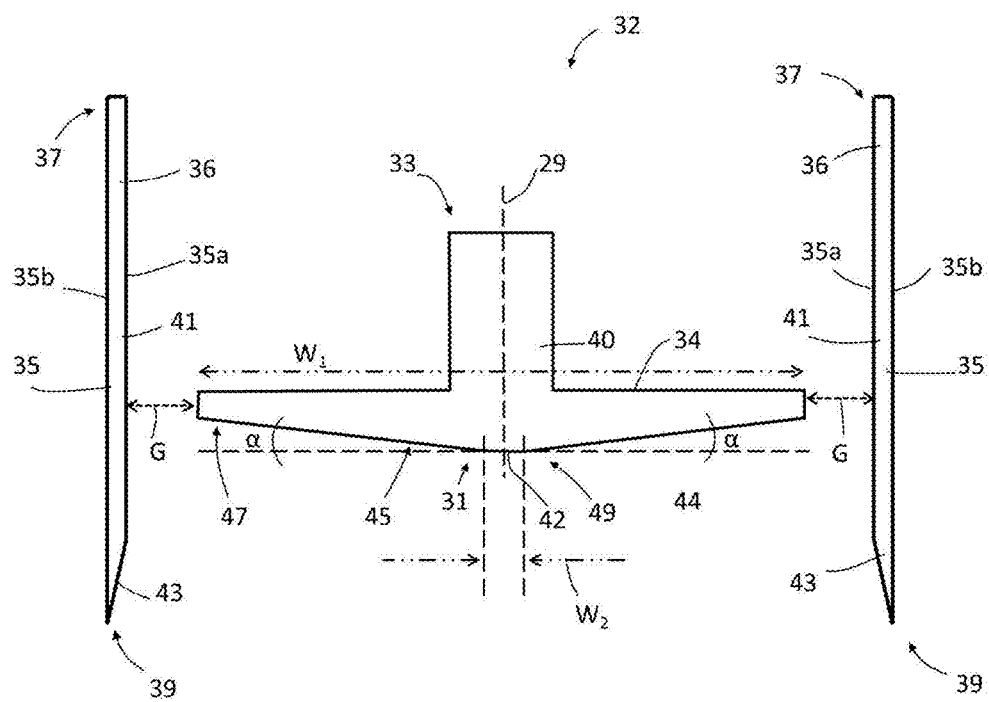
FIG. 6 is a cross sectional side view of a dough press assembly in accordance with the principles of the present disclosure.

Referring to FIG. 6, an example of a dough press assembly 32 is illustrated. FIG. 5 is a cross-sectional side view of the dough press assembly 32. In this example, the dough press assembly 32 includes a pressure plate 34 and a cutting die 36. The dough press assembly 32 can comprise any suitable materials, such as stainless steel or other suitable metal, nylon material, PVC, other plastics, or a combination thereof. In a preferred embodiment, the dough press assembly 32 consists of food grade materials.

The dough press assembly 32 is used to cut sheets of dough in a randomized shape. It is appreciated that the dough can be cut to a variety of sizes such that the sheet length, diameter, and thickness can vary from one cut to another. While the overall shape may be recognized as a circle or square, the outer edge of the dough is intentionally randomized to create a ragged outline, more like the outline of a ragged coastline. The dough press assembly 32 can be used for the mass production of pizza crusts. The sheets of dough that the dough shapes are cut out of can be of great lengths and widths typical of mass production. The dough press assembly 32 is fully automated and can be run at high speeds.

The diameter of the pizza crust can range from about 5 inches to about 16 inches. In one embodiment, the diameter can range from about 11 inches to about 12.15 inches. In another embodiment, the diameter can range from about 11.6 inches to about 11.75 inches. In other embodiments, the diameter can range from about 13 inches to about 15 inches. In one embodiment, the diameter can range from about 8 inches to about 10 inches.

The pressure plate 34 is of a unique and functional design. The pressure plate 34 rapidly descends onto the sheet dough to press and apply pressure, creating the unusual splash rippling effect which has been found to contribute to the random appearance of the finished product or crust. The functionality of the pressure plate 34 is illustrated and described in more detail with reference to FIGS. 8-10.

The cutting die 36 has an irregular shape that includes a main body 35. The main body 35 includes an inner surface 35a (e.g. interior surface) adjacent to the pressure plate 34 and an outer surface 35b. The main body 35 extends from a proximal end 37 of the cutting die 36 to a distal end 39 of the cutting die 36. In this example, the cutting die 36 includes a linear portion 41 that extends along a majority of the main body 35 and an angled portion 43 at the inner surface 35a of the cutting die 36. The main body 35 comprises an interior surface 35a surrounding an interior space. The angled portion 43 is near the distal end 39 of the cutting die 36 and is configured to engage the sheet dough 24 for cutting therethrough. The distal end 39 of the cutting die 36 can include an irregular shape in the plane of the pressure plate 34 (i.e., a base member 38 of the pressure plate 34) and a sharp edge created by the angled portion 43, configured to cut the sheet or balled dough 24 into an irregular shape. It will be appreciated that other arrangements and configurations of the cutting die 36 may be used to cut the sheet dough 24.

The cutting die 36 is positioned outside the perimeter of the pressure plate 34 to cut the sheet dough 24 of irregular shape. In one example, the outer perimeter of the pressure plate 34 and outline of the cutting die 36 are parallel such that they have the same pattern. The arrangement of the pressure plate 34 and the cutting die 36 is such that the two components cooperatively function together to form a dough crust. The dough press assembly 32 has an axis of symmetry that extends along a longitudinal axis 29 from a proximal end 31 of the dough press assembly 32 to a distal end 33 of the dough press assembly 32. The functionality of the cutting die 36 is illustrated and described in more detail with reference to FIGS. 8-10.

FIG. 6 illustrates features of the pressure plate 34 and the cutting die 36. In this example, dough press assembly 32 including the pressure plate 34 and the cutting die 36 has generally a circular configuration. The pressure plate 34 includes a base member 38 provided with an upwardly extending guide member 40. It will be appreciated that the dough press assembly 32 can generally take the shape of a rectangle, square, oval, or any other geometry, such as, but not limited to polygons (see FIGS. 11-14) in the plane of the base member 38. The pressure plate 34 can be arranged within the interior space defined by the gap G.

In one example, the base member 38 has a width $W_1$ from about 2 inches to about 24 inches. Depending on the type of dough food being prepared, the width $W_1$ can be smaller or larger. For example, in preparation of a pastry-type product, the width $W_1$ can be smaller, e.g., from about 2 to about 6 inches. Different types of pizzas can also be made with different size crusts. For example, in preparation of a personal sized pizza, the width $W_1$ can be smaller and can range from about 4 to about 12 inches. In preparation of larger pizza crusts, the width $W_1$ can be correspondingly larger. The width $W_1$ can range from about 2 inches to about 18 inches, or from about 4 to about 16 inches, or from about 6 to about 14 inches, for example, when making a deep dish crust. In some embodiments, the width $W_1$ can range from about 3 inches to about 22 inches, from about 4 inches to about 20 inches, from about 5 inches to about 18 inches, from about 6 inches to about 17 inches, or from about 8 inches to about 16 inches. In one embodiment, the width $W_1$ can range from about 5 inches to about 7 inches. In other embodiments, the width $W_1$ can range from about 10 inches to about 11 inches. In another embodiment, the width $W_1$ can range from about 7 inches to 9 inches. In certain embodiments, the width $W_1$ can range from about 8 inches to about 13 inches. In other embodiments, the width $W_1$ can range from about 14 inches to about 15 inches. In one embodiment, the width $W_1$ can range from about 10.4 inches to about 10.6 inches. It should be noted that because of the irregular shape of the base member 38, the width $W_1$ will vary around the perimeter of a given base member 38.

The base member 38 includes a pressing surface 45 including a first zone 42 and a second zone 44. The first zone 42 is a horizontal, generally flat zone located in the center of the base member 38. The width $W_2$ of the first zone 42 can vary on average from about 1 to about 20 inches, from about 2 to about 15 inches, or from about 3.5 inches to about 7 inches. In one embodiment, the width $W_2$ can vary from about 3.5 inches to about 5 inches. In another embodiment, the width $W_2$ can vary from about 3.75 inches to about 4.0 inches. In still another embodiment, the width $W_2$ can vary from about 5 inches to about 7 inches. In other embodiments, the width $W_2$ can vary from about 6.75 inches to about 7 inches. The width $W_2$ of the first zone 42 can change with the overall shape or configuration of the pressure plate 34 to generally mimic the overall structure of the pressure plate 34. As with the overall width $W_1$ of the base member 38, the width $W_2$ of the first zone can vary around the perimeter of the first zone (see FIGS. 11-14).

The second zone 44 of the base member 38 extends form the first zone 42 at a taper angle such that an outer end 47 of the second zone 44 is recessed from an inner end 49 adjacent the first zone 42, while the first zone 42 protrudes outwardly in the direction of the longitudinal axis 29. The second zone 44 may be non-uniform and can add to the random structure of the sheet dough 24. The second zone 44 extends radially from the first zone 42 forming an incline or slope angle α. The slope angle α can vary from about 1 to about 10 degrees, or from about 2 degrees to about 5 degrees. In one embodiment, the slope angle α can vary from about 1 degree to about 4 degrees. In other embodiments, the slope angle α can vary from about 2 degrees to about 3 degrees. In another embodiment, the slope angle α can vary from about 3 degrees to about 5 degrees. In still other embodiments, the slope angle α can vary from about 1 degree to about 3 degrees. It is understood that the slope angle α can change with varying configurations of the pressure plate 34.

The pressure plate 34 and the cutting die 36 together define a gap G (e.g., interior space) between the outer perimeter of the pressure plate and the inside wall 35a of the cutting die 36. The gap G can be constant around the outside perimeter of the pressure plate 34 and inside the cutting die 36, or may vary while still remaining within the ranges below. The gap G can range from about 0.1 to about 3 inches, from about 0.2 to about 2 inches, or from about 0.3 inches to about 1.0 inches. The gap G can range from about 0.3 inches to about 1.5 inches, for example, when making a deep dish crust. In one embodiment, the gap G can range from about 0.47 inches to about 0.71 inches. In another embodiment, the gap G can range from about 0.1 inches to about 1.0 inches. In some other embodiments, the gap G can range from about 0.3 inches to about 0.6 inches. In certain embodiments, the gap G can range from about 0.75 inches to about 1.0 inches. The gap G can be varied relative to an initial thickness T (see FIG. 7) of the sheet dough 24. Generally, a wider gap G may be selected for greater thicknesses T.

As depicted in FIGS. 11-14, the gap G value may vary around the outside perimeter of the pressure plate 34 and inside the cutting die 36 such that the gap G is not held constant. The variance of the gap G around the outside perimeter of the pressure plate 34 and inside the cutting die 36 can be up to about 20% of an average gap G value. In one example, the variance of the gap G around the outside perimeter of the pressure plate 34 and inside the cutting die 36 can be less than about 20% of the average gap G value. In another example, the variance of the gap G around the outside perimeter of the pressure plate 34 and inside the cutting die 36 can be less than about 10% of the average gap G value. In yet another example, the variance of the gap G around the outside perimeter of the pressure plate 34 and inside the cutting die 36 can be less than about 5% of the average gap G value.

Figure 7:
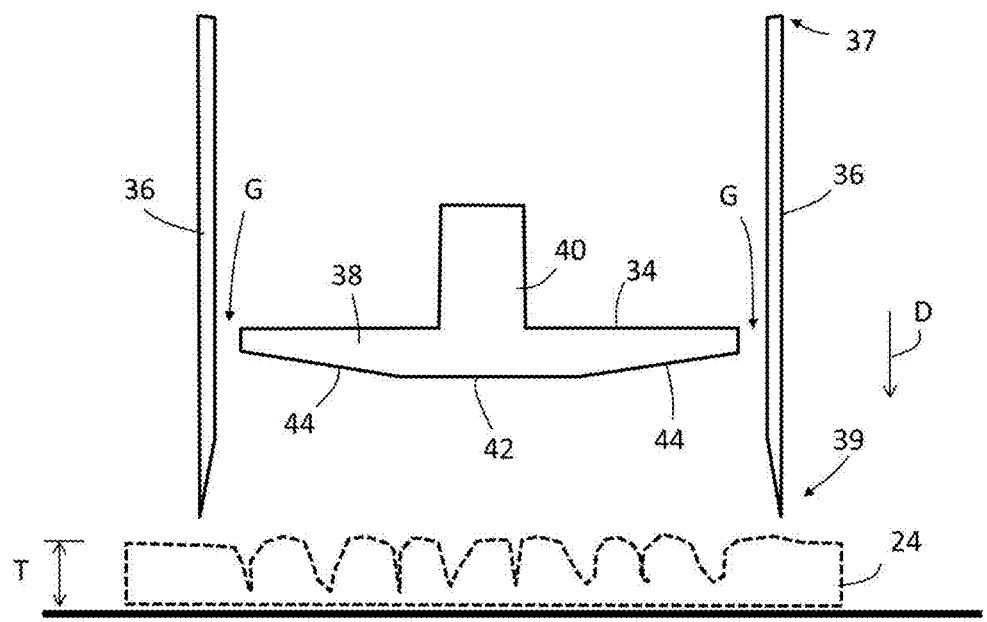
FIG. 7 is a cross sectional side view of the dough press assembly shown in FIG. 5 illustrating the cutting die in a raised position prior to engaging sheeted dough.
Figure 8:
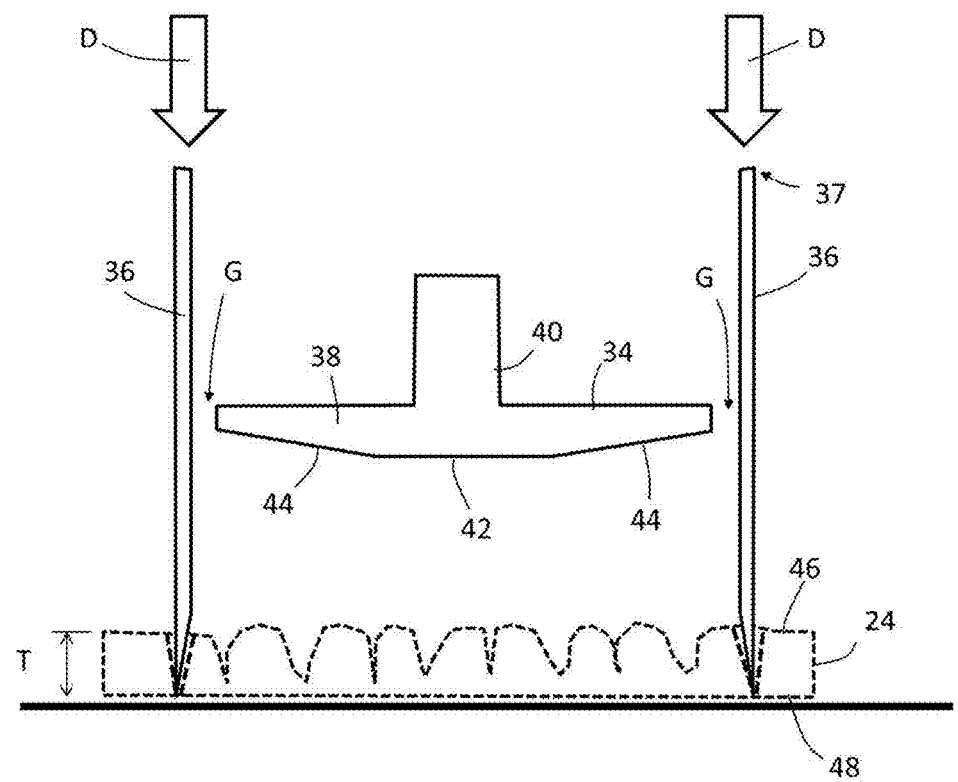
FIG. 8 is a cross sectional side view of the dough press assembly shown in FIG. 5 illustrating the cutting die in a lowered position cutting the sheeted dough.

FIGS. 7-8 illustrate the actions of the cutting die 36. Referring to FIG. 7, the cutting die 36 is shown in its raised position before engaging the sheet dough 24. The cutting die 36 can be lowered in a conventional manner for automatic production assemblies apparent to those skilled in the art. The cutting die 36 can be arranged and configured to move in a downward direction D to engage the sheet or balled dough 24.

Referring to FIG. 8, the cutting die 36 is shown in its lowered position. The cutting die 36 transitions from the raised position to the lowered position to cut the sheet dough 24 as shown. As the cutting die 36 is lowered, the angled portion 43 at the proximal end 37 engages the top surface 46 of the sheet dough 24. The cutting die 36 can continue to move in the direction D until it reaches the bottom of its stroke and cuts through to the bottom surface 48 of the sheet or balled dough 24. The gap G between the pressure plate 34 and the cutting die 36 can be maintained constant while the cutting die 36 cuts the sheet or balled dough 24. Then the cutting die 36 can be automatically lifted in a conventional manner to the fully raised position shown in FIG. 7.

Figure 9:
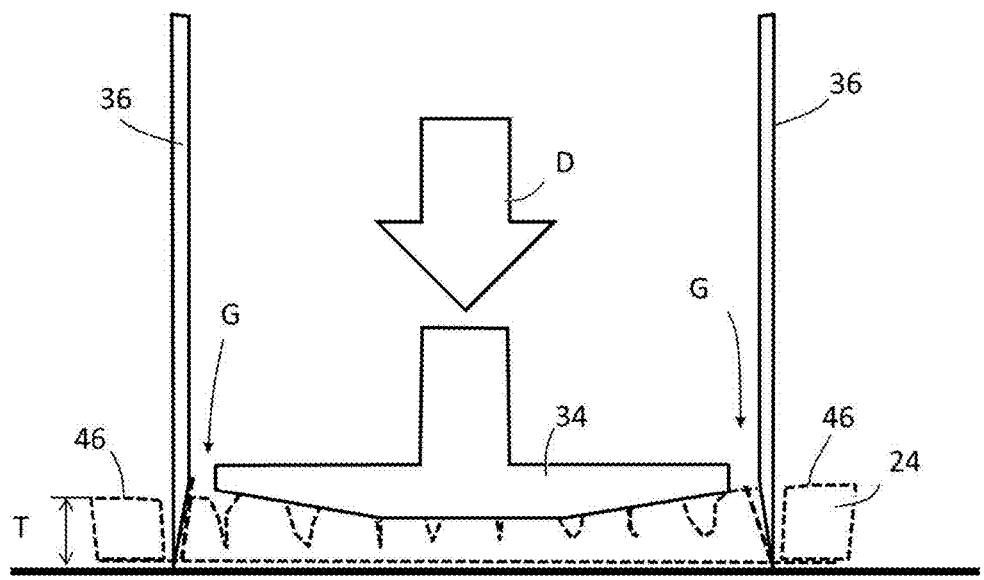
FIG. 9 is a cross sectional side view of the dough press assembly shown in FIG. 5 illustrating the pressure plate in a lowered position pressing the sheeted dough.
Figure 10:
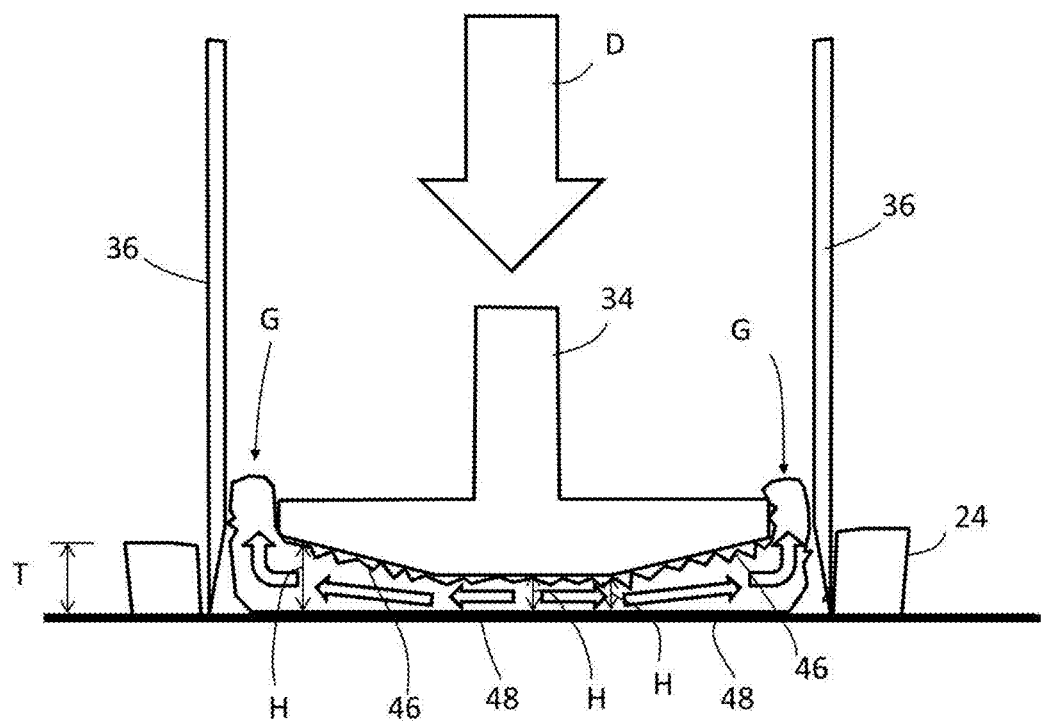
FIG. 10 is a cross sectional side view of the dough press assembly shown in FIG. 5 illustrating pressing of the sheeted dough by the pressure plate.

FIGS. 9-10 illustrate the actions of the pressure plate 34. The pressure plate 34 is configured to be raised and lowered automatically via conventional operation procedures. For example, the pressure plate 34 can be raised or lowered by a piston and cylinder assembly or any other manner known in the art. While only one dough press assembly 32 is shown, it is readily apparent to those skilled in the art that multiple dough press assemblies 32 can be mounted to a platform in a planar relationship to simultaneously or independently move a multiple arrangement of dough press assemblies 32, each consisting of a pressure plate 34 and a cutting die 36 to produce crust.

Referring to FIG. 9, the pressure plate 34 is shown in a lowered position. In this example, after the cutting die 36 cuts the sheet dough 24, the pressure plate 34 descends and applies pressure rapidly to the top surface 46 of the sheet or balled dough 24. The rapid application of pressure to the dough by the pressure plate 34 causes a "splash rippling effect" in the sheet or balled dough 24. The surface of the dough is elastic and the sudden application of pressure to the dough sheet or dough ball creates a rippling effect through the dough that results in the introduction of additional structure stresses within the sheet or ball. The ripple effect is due in part to the viscoelastic properties of the dough, and the air pockets and other irregularities of shape on the dough surface created, in part by knuckle docking, further contribute to the rippling effect. The amount of time between application of pressure by the pressure plate 34 and cutting by the cutting die 36 can help to obtain the desired effects of irregularity or randomization. The movement of the pressure plate 34 can be applied soon after the cutting die 36 has cut the sheet dough 24, for example a few milliseconds after the dough is cut. If the time between the application of pressure and cutting is several seconds long rather than several milliseconds, the unique randomization effects may not take place because the sheet or balled dough 24 is likely to shrink after cutting, thereby lessening the irregularity or randomizing effect.

The process may be applied without significant addition or subtraction of heat. If there is addition or subtraction of heat, any such addition or subtraction is preferably minor and of no significant effect. Temperature of dough after proofing is approximately 65° F. or higher, or about 70° F. to 115° F., more commonly 80° F. to 90° F. Equipment used to apply patterns and compression plates to the dough can be held at ambient room temperatures of approximately 68° F. to 73° F.

Referring to FIG. 10, the pressure from the pressure plate 34 can force the sheet or balled dough 24 to flow outward in a radial direction and upward between the gap G between the pressure plate 34 and the cutting die 36. The splash rippling effect can be seen on the top surface 46 of the sheet dough 24. The splash rippling effect also forces portions of the sheet or balled dough 24 to flow outward and upward into the gap area G where the dough flow is contained by the cutting die 36 and forms a crust edge having the appearance of built-up crust edge, which is one feature of a handmade crust. The sheet or balled dough 24 follows along between the inner surface 35a of the main body 35 of the cutting die 36 and the pressure plate 34.

In this example, the application of pressure by the pressure plate 34 to the top surface 46 of the sheet dough 24 can range from about 0.05 to about 4 seconds, from about 0.1 to about 2 seconds, from about 0.2 to about 1 second, or from about 0.3 seconds to about 0.7 seconds. In one embodiment, the time application of pressure can range from about 0.5 seconds to about 0.7 seconds. In another embodiment, the time application of pressure can range from about 0.3 seconds to about 0.5 seconds. In other embodiments, the time application of pressure can range from about 0.1 seconds to about 1.0 second. In other embodiments, the time application of pressure can range from about 0.7 seconds to about 1.0 second. The pressure plate 34 can then be raised to its former position. The most efficient automated process has the shortest stroke time to increase the overall speed of production. The stroke speed of the pressure plate 34 may not be limited by stroke height.

The pressure plate 34 can be positioned initially at any suitable distance above the top surface 46 of the sheet dough 24. For example, the pressure plate 34 can be positioned from about 2 inches to about 10 inches above the top surface 46 of the sheet dough 24. It will be appreciated that the pressure plate 34 can be positioned at various heights above the top surface 46 of the sheet dough 24. During the downward stroke, the pressure plate 34 descends rapidly in the direction D such that the initial thickness T of the sheet dough 24 can change under pressure to define a vertical height H (e.g., gap) between the pressure plate 34 and the bottom surface 48 of the sheet dough 24. In the depicted example, the vertical height H may vary in height across the pressure plate 34 between the first zone 42 and the second zone 44. The vertical height H can range from about 0.1 to about 1.5 inches, or from about 0.2 inches to about 1.0 inches upon maximum compression. In one embodiment, the vertical height H can range from about 0.12 inches to about 0.2 inches. In other embodiments, the vertical height H can range from about 0.16 inches to 0.3 inches. In another embodiment, the vertical height H can range from about 0.4 to about 0.6 inches. In still other embodiments, the vertical height H can range from about 0.6 inches to about 0.8 inches.

In one embodiment, the amount of pressure applied by the pressure plate 34 can range from about 200 to about 900 psi, from about 300 to about 800 psi, or from about 500 psi to about 700 psi. In one embodiment, the pressure can range from about 400 psi to about 500 psi. In another embodiment, the pressure can range from about 500 psi to about 600 psi. In other embodiments, the pressure can range from about 600 psi to about 700 psi. In still other embodiments, the pressure can range from about 700 psi to about 800 psi. It will be appreciated that the pressure can vary relative to the initial thickness T of the sheet dough 24. For example, the thicker the sheet dough 24 is initially, the less pressure is applied.

Figure 11:
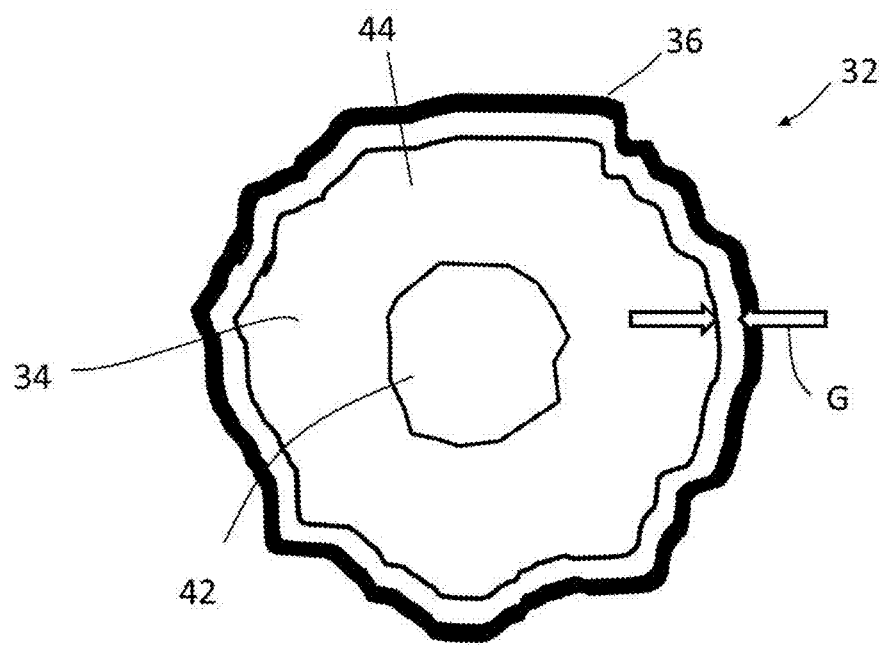
FIG. 11 is a bottom view of the dough press assembly shown in FIG. 5 illustrating the irregular shape of the cutting die and pressure plate.

FIG. 11 is a bottom plan view of the dough press assembly 32. As depicted in FIG. 11, the pressure plate 34 and the cutting die 36 are shown having similar irregular shaped outer perimeters. The irregular shaped outer perimeters are a result of the randomized effect imparted by the multiple processes discussed above. The gap G between the pressure plate 34 and the cutting die 36 is approximately constant.

Figure 12:
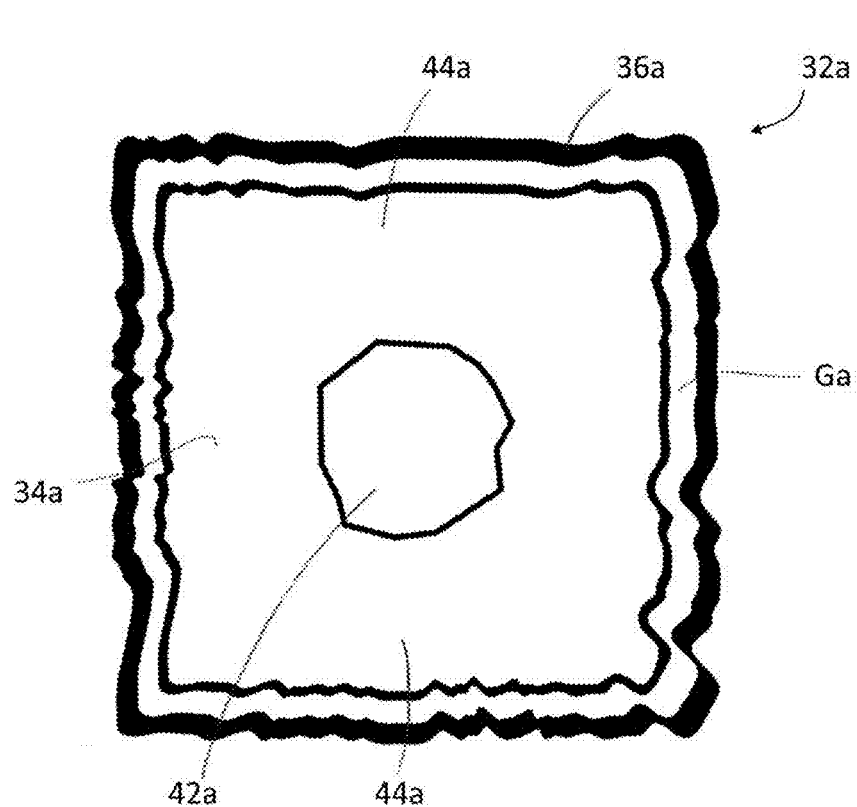
FIG. 12 is a bottom view illustrating another irregular shape of a dough press assembly in accordance with the principles of the present disclosure.
Figure 13:
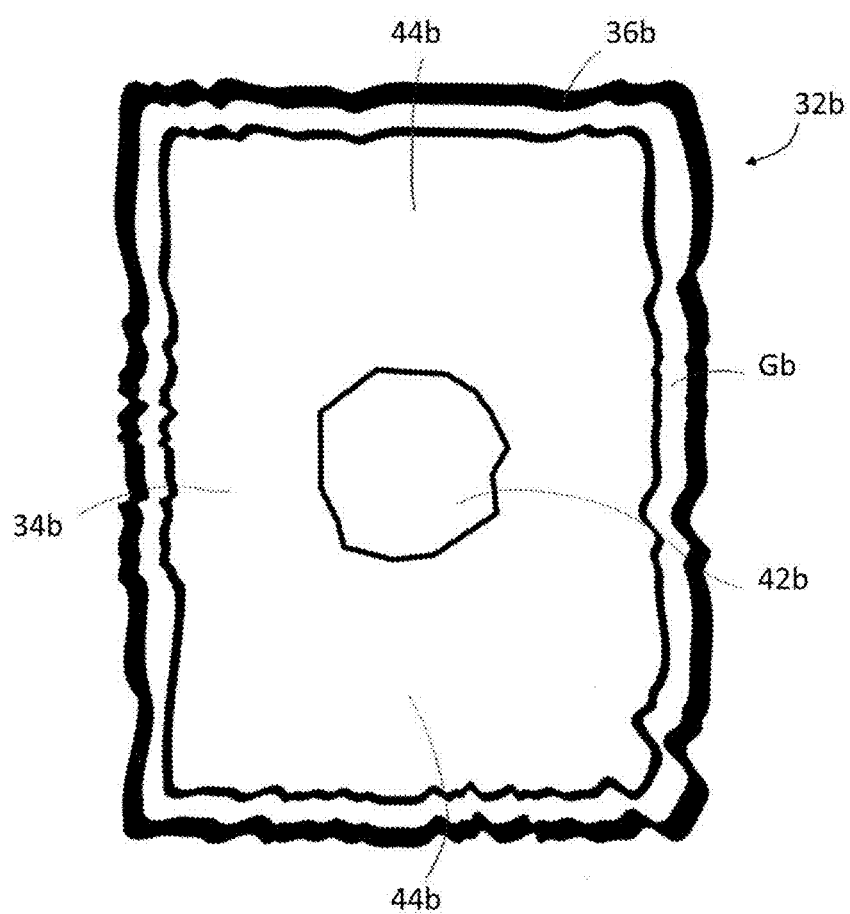
FIG. 13 is a bottom view illustrating another irregular shape of a dough press assembly in accordance with the principles of the present disclosure.
Figure 14:
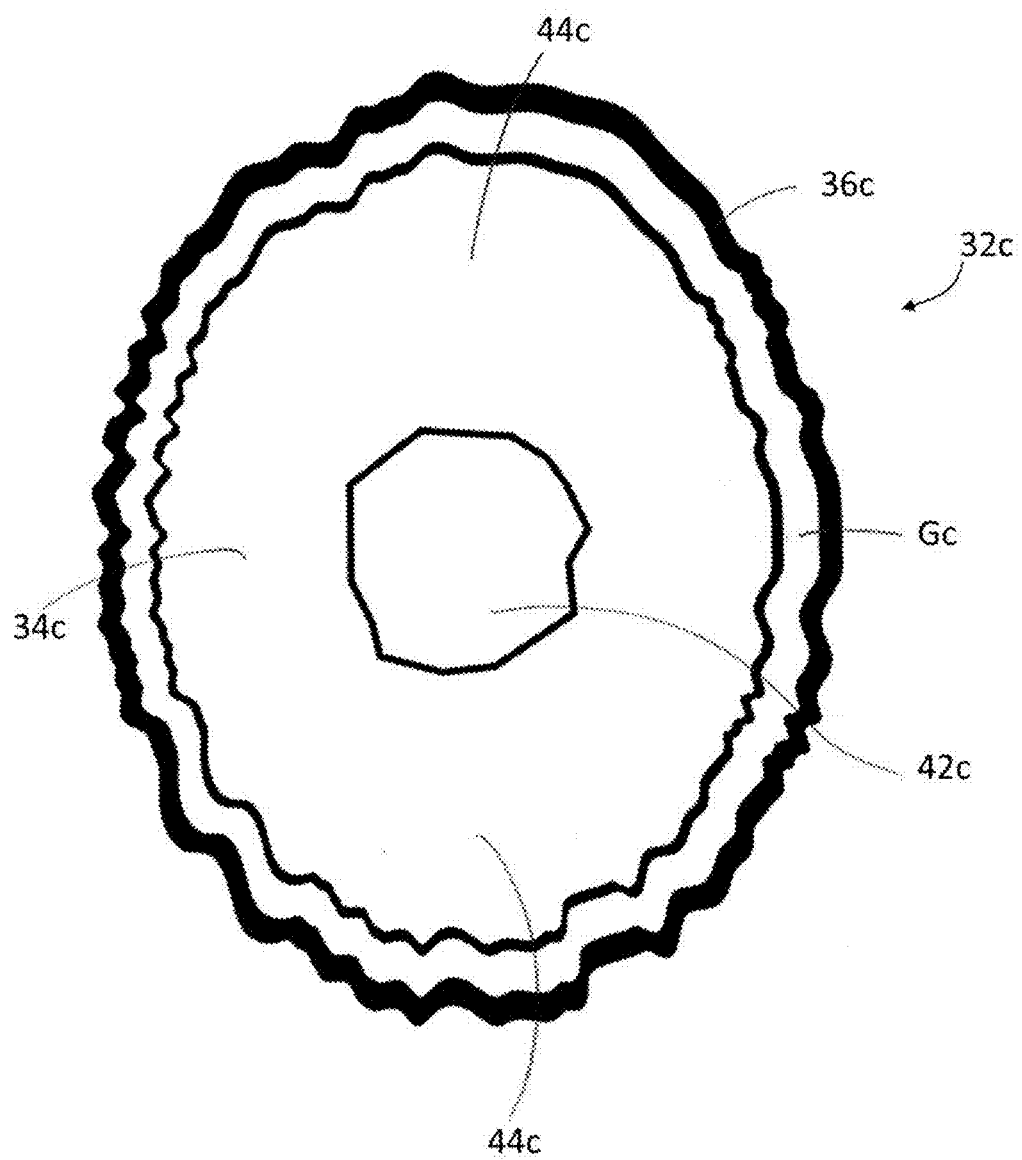
FIG. 14 is a bottom view illustrating another irregular shape of a dough press assembly in accordance with the principles of the present disclosure.

FIGS. 12-14 illustrate alternative exemplary embodiments of the dough press assembly 32. FIG. 12 illustrates a dough press assembly 32a that has generally a square shape. Many of the possible aspects and features for the dough press assembly 32a are disclosed or are similar to the dough press assembly 32 shown in FIGS. 6-11, for example. In one example, the gap Ga varies around the outside perimeter of the pressure plate 34a and inside the cutting die 36a such that the gap Ga is not constant.

FIG. 13 illustrates a dough press assembly 32b that has generally a rectangular shape. Many of the possible aspects and features for the dough press assembly 32b are disclosed or are similar to the dough press assembly 32 shown in FIGS. 6-11, for example. In one example, the gap Gb varies around the outside perimeter of the pressure plate 34b and inside the cutting die 36b such that the gap Gb is not constant.

FIG. 14 illustrates a dough press assembly 32c that has generally an oval shape. Many of the possible aspects and features for the dough press assembly 32c are disclosed or are similar to the dough press assembly 32 shown in FIGS. 6-11, for example. In one example, the gap Gc varies around the outside perimeter of the pressure plate 34c and inside the cutting die 36c such that the gap Gc is not constant.

Figure 15:
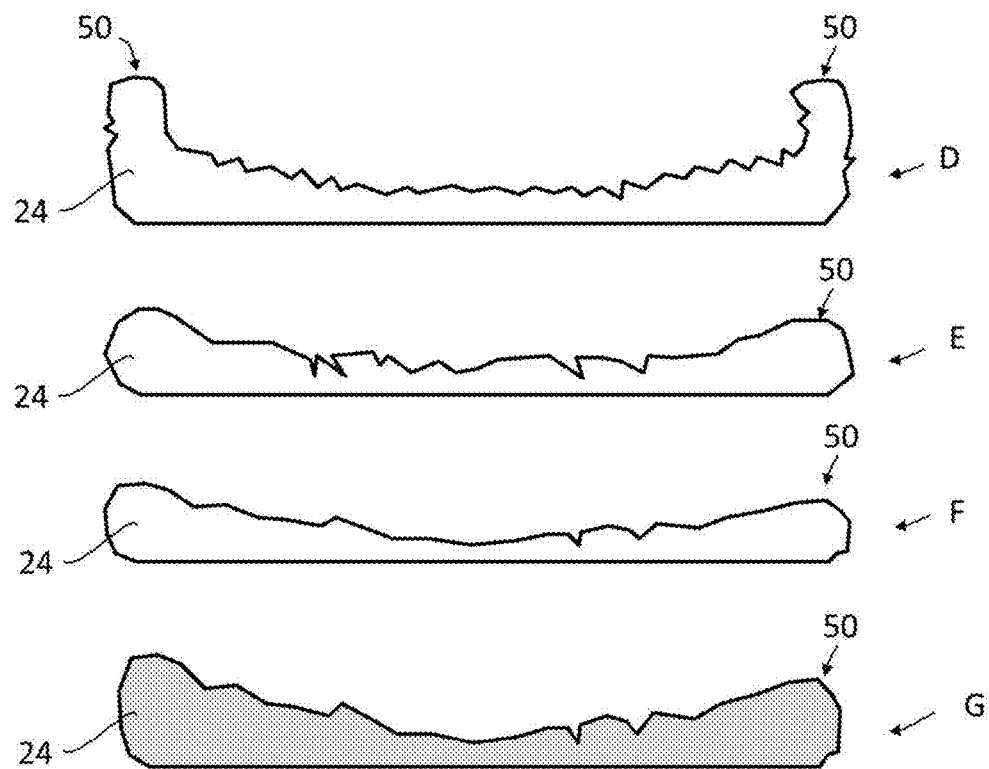
FIG. 15 shows cross sectional side views of the sheeted dough undergoing metamorphosis after compression.

FIG. 15 illustrates an example of how the sheet or balled dough 24 undergoes metamorphosis after compression. In this example, the sheet or balled dough 24 undergoes metamorphosis immediately after being cut and pressed. The initial configuration of the sheet or balled dough 24 is shown at D. As depicted, the sheet or balled dough 24 is thinner in the center and thickens moving away from the center toward edges 50. After some time the dough begins to relax as shown at E and continues to do so as represented by F. The sheet or balled dough 24 is then par baked which sets the final structure of the crust as shown in G, where the parbaked crust has some upward expansion and lateral contraction compared to the initial structure of the crust following compression as shown by D. In certain examples, the sheet or balled dough 24 may undergo this process of metamorphosis anywhere between about zero to about 60 minutes, or about 1 minute to about twenty minutes under a temperature from about 45° F. to about 120° F. It will be appreciated that the time and temperature for metamorphosis may vary with other embodiments.

Figure 16:
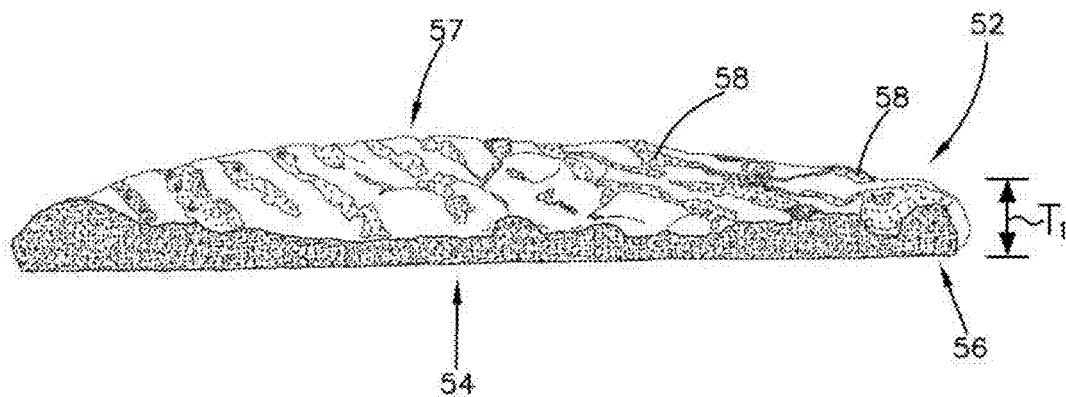
FIG. 16 is a cross-sectional perspective view of an example par baked crust in accordance with the principles of the present disclosure.
Figure 17:
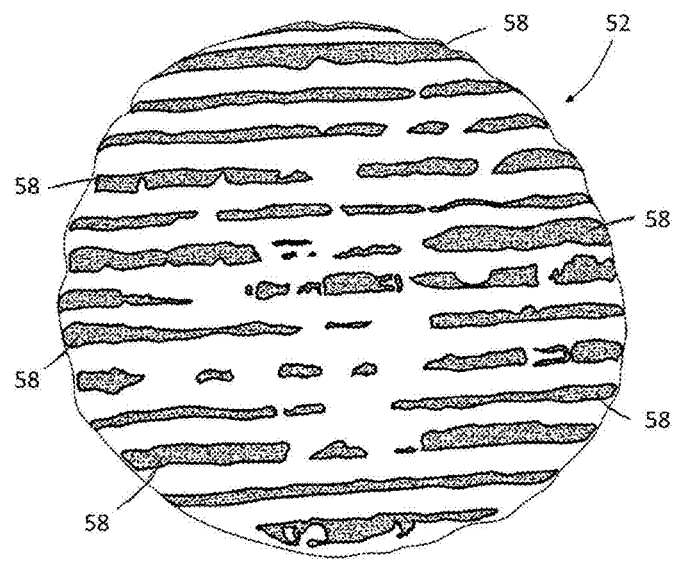
FIG. 17 is a top view of the par baked crust shown in FIG. 15 showing grill marks in accordance with the principles of the present disclosure.

According to an embodiment, the appearance of the food product can be further enhanced by optionally adding grill marks onto the food product. In particular, adding grill marks to a parbaked pizza crust may increase the artisanal appearance of the crust 52. Irregular grill marks can further enhance the randomized appearance by accentuating topographical features of the par baked crust 52. Referring to FIGS. 16 and 17, a perspective view and a top view of the par baked crust 52 is illustrated with grill marks 58. The grill marks 58 can be defined as a network of non-uniform spaced substantially horizontal and/or perpendicular lines. The embossed or compressed zones are arranged upon or along an imaginary grid-like pattern. The grill marks 58 can be perpendicular or have an angle that departs substantially from the perpendicular.

Figure 18A:
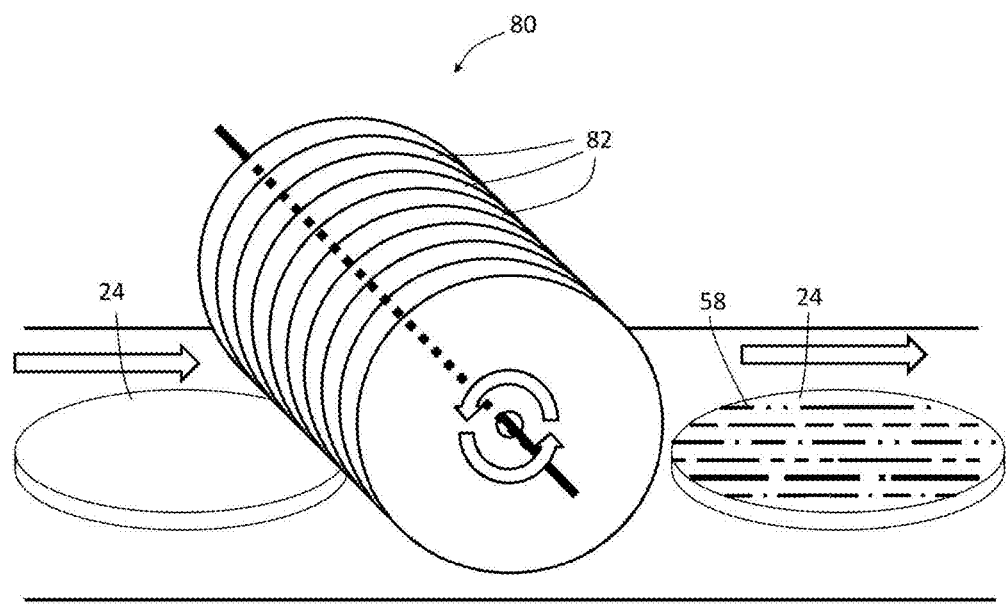
FIGS. 18A-18C are schematic depictions of a grill mark applicator in accordance with the principles of the present disclosure.
Figure 18B:
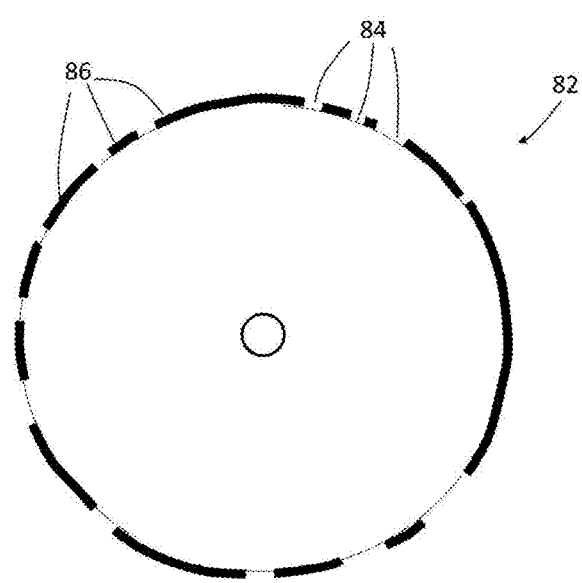
Figure 18C:
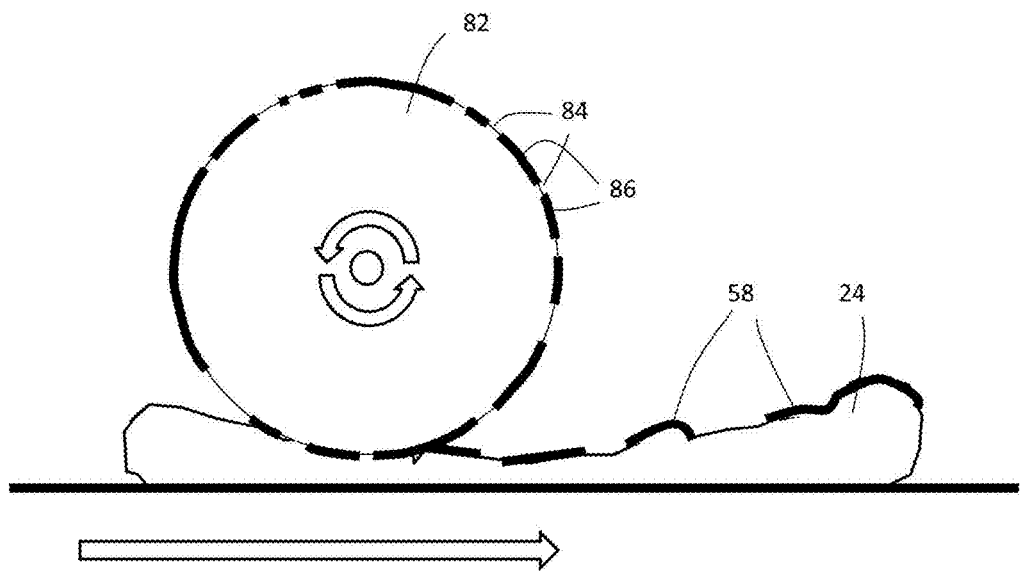
Figure 19:
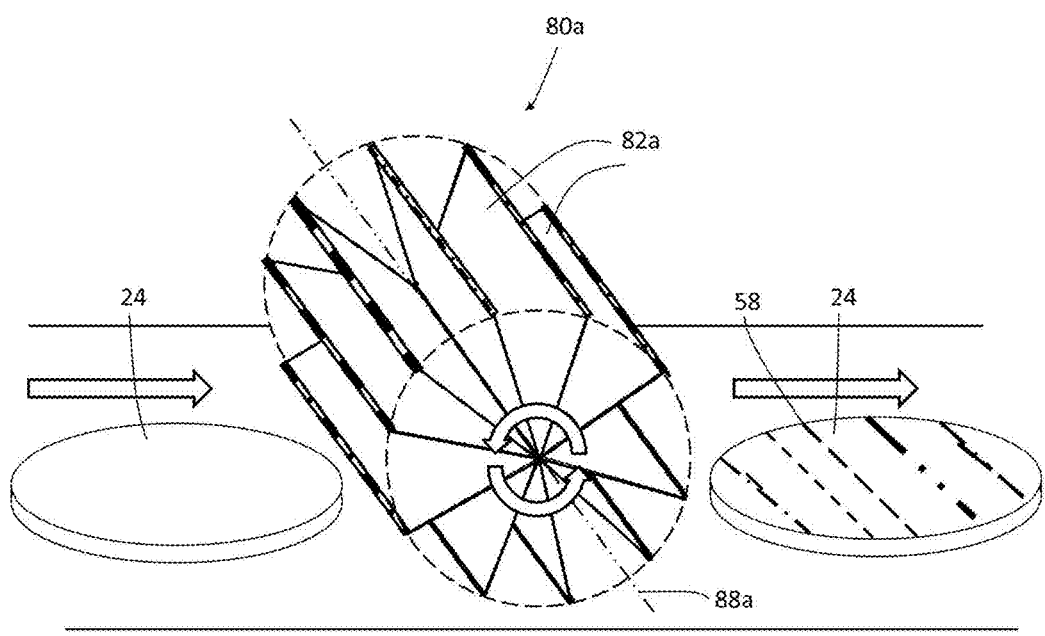
FIG. 19 is a schematic depiction of another example of a grill mark applicator in accordance with the principles of the present disclosure.

The grill marks 58 can be made by using a grill mark applicator assembly 80. The grill mark applicator assembly 80 may comprise, for example, a series of rotated heated disks 82 that roll over the sheet dough 24, as shown in FIGS. 18A-18C. In an alternative embodiment, the grill mark applicator assembly 80a comprises radially-arranged heated rectangular bars or disks 82a that rotate in a circular fashion about a transverse axis 88a, as shown in FIG. 19. The grill marks 58 can differ in thickness and discontinuity so that there are gaps in the grill marks 58. In certain examples, the grill marks 58 can be applied to both top and bottom surfaces of the par baked crust 52.

As exemplified in FIG. 17, the grill marks 58 can be arranged and configured to further provide randomization to the par baked crust 52. In some examples, the grill marks 58 can be irregular when applied to the par baked crust 52.

In certain examples, the grill marks 58 can have different thickness, different iterated dots and different dashes along a length of the grill marks 58 to provide a randomized effect. The contoured surface of the par baked crust 52 further contributes to the randomized appearance of the grill marks as the raised surfaces of the par baked crust 52 are covered with the grill marks 58. In one example, the grill marks 58 are added by rotating disks 82, where only those parts of the disks having no gap 84 can deposit grill marks 58 onto the pizza crust top and bottom surfaces. FIG. 18B shows a single rotating disk 82, showing grill mark applicator sections 86 disposed at the perimeter of the disk 82 and separated by gaps 84. The rings on the disk can temporarily compress down on the surface of the par baked crust 52 to mark the uppermost protruding surfaces of the par baked crust 52. This marking can accentuate the random topographical structure and appearance of the par baked crust 52.

FIG. 16 is a cross-sectional view of an example par baked crust 52 having an irregular surface 57. According to embodiments, the thickness T of the crust 52 varies in a random pattern throughout the crust 52. The indentations provided by knuckling, the rippling effect caused by stamping, and the air pockets 59 all contribute the uneven thickness T of the crust. When thickness T is measured at multiple points throughout the crust 52, the thickness at a given measuring point can vary up to about 100% of an average thickness of the crust 52. In some embodiments, the thickness can vary between about 10% to about 90%, between about 20% to about 80%, or between about 30% to about 60% of the average thickness. Standard deviation ("SD") can be used to express variability in a measurement, such that a low SD indicates that all of the data points are close to the average, and a high SD indicates that the data points are highly varied. In an embodiment, the thickness T of the crust 52 has a standard deviation of about 10% to about 40%, about 15% to about 35%, or about 20% to about 30% of the average thickness of the crust.

According to an embodiment, the width of the raised edge portion of the pizza crust 52 may also vary throughout the perimeter of the crust. For example, the width at a given measuring point can vary up to about 80% of an average width of the raised edge portion. In some embodiments, the width can vary from about 5% to about 70%, or from about 10 to about 60% of the average width.

According to an embodiment, the method of the present disclosure is capable of introducing several degrees of randomness to the manufactured food products (e.g., pizza crusts) that result in an appearance of an artisanal product. A first degree of randomness is achieved by applying impressions/embossings by the knuckle docking device 10. A second degree of randomness is achieved by cutting the crust into an irregular shape. A third degree of randomness is achieved by stamping the crust with the pressure plate 34. A fourth degree of randomness is achieved by applying irregular grill marks on the crust by use of the grill mark applicator assembly 80.

The randomly shaped and contoured surface of the sheet or balled dough 24 is set by par baking the sheet or balled dough 24 into the par baked crust 52. Generally, the time for par baking the sheet or balled dough 24 can range from about 0.5 minutes to about 15 minutes at a temperature of about 350° F. to about 900° F. The par baked crust 52 has a gradual change in thickness $T_1$ from a center 54 of the par baked crust 52 to the outer edge 56 of the par baked crust 52. Generally, the par baked crust 52 has a bowl shape. The elevation of the outer edge 56 relative to the center 54 is similar to that of hand stretching dough. When hand stretched, the center tends to be lower and the edge crust higher or thicker. The bowl shape encourages toppings, line pizza sauce and melted cheese, to keep within the outer bounds of the crust and not spill over the outer edge 56. In some embodiments, the outer edge 56 has an average thickness that is about 1.5 to about 3 times the average thickness of the center portion of the crust, or about 1.75 to about 2.5 times the average thickness, or about 2 times the average thickness of the center portion of the crust; the term "center portion" being used here to refer the area of the crust that is surrounded by the outer edge 56.

The parbaked crust is generally uncolored due to minimal maillard browning during parbaking, but the starch in the dough is generally gelatinized and the proteins denatured such that the structure of the crust is set by the parbaking. The maillard browning of the pizza is completed during the final baking step by the consumer prior to consumption. Following parbaking and the optional application of grill marks 58 to the crust, the crust can be frozen, packaged in multiple crust packaging and shipped to a location for topping, packaging, and shipment to retail stores.

Alternatively, the crusts are immediately topped with sauce, cheese, and/or other suitable toppings to form a pizza product having an artisan, handmade appearance. A variety of typically tomato based sauces, a variety of cheeses and cheese blends can be used in combination with toppings selected from meat sources, fish sources, vegetable sources or fruit sources or other typical topping materials. Pizza sauces can include a variety of ingredients including tomato portions, tomato sauce, tomato paste, seasonings including salt and spices. Cheeses can include mozzarella, Romano, Parmesan, jack and others. Commonly, cheeses in the form of shaved, crumbled or string form derived from mozzarella, Romano, Parmesan, provolone and whole milk or non-pasteurized cheeses can be used. Cheeses and cheese blends can be used both in the form of blended materials wherein two or more cheeses are blended and then applied to the crust. However, cheeses can also be added to the crust in layers without premixing.

Premium quality meats, including Italian sausages, pepperoni, prosciutto, seafoods such as shrimp, mussels, etc. can be used to top the pizza product. Vegetarian pizzas can also be made including vegetables such as spinach, mushrooms, onions, green peppers, etc. Fruit materials can also be used on the pizzas, both in a vegetarian and non-vegetarian form. Pineapples, apples, etc. can also be used. Examples of pizza products comprising the crust of the disclosure include Italian style pepperoni pizzas with a blended cheese topping, and Italian cheese pizzas having no other meat toppings but optionally including vegetable add-ons, classic supreme pizzas including pepperoni, Italian sausage, green pepper, onion, and/or mushrooms; southwest chicken pizzas including grilled chicken, Mexican salsa, corn, beans, and other Tejano or Mexicano seasonings. A spinach and roasted mushroom pizza can also be made using rough-cut spinach and chopped and roasted mushrooms. Other examples of toppings include bacon and blended cheese of Italian origin including mozzarella, Parmesan, and Romano.

The assembled pizza product can then be frozen and packaged using conventional methods and shipped to retail outlets. At the retail outlet, the pizzas are maintained in frozen condition in freezer chests for purchase. Consumers can then purchase the frozen pizzas and can maintain them at home in a frozen state until cooked. Commonly, the pizzas are removed from conventional packaging materials and placed in consumer ovens and cooked at a temperature of 375° F. to 450° F. for 8-20 minutes to complete cooking of the dough and to fully cook the cheese, sauce and other toppings.

Figure 20:
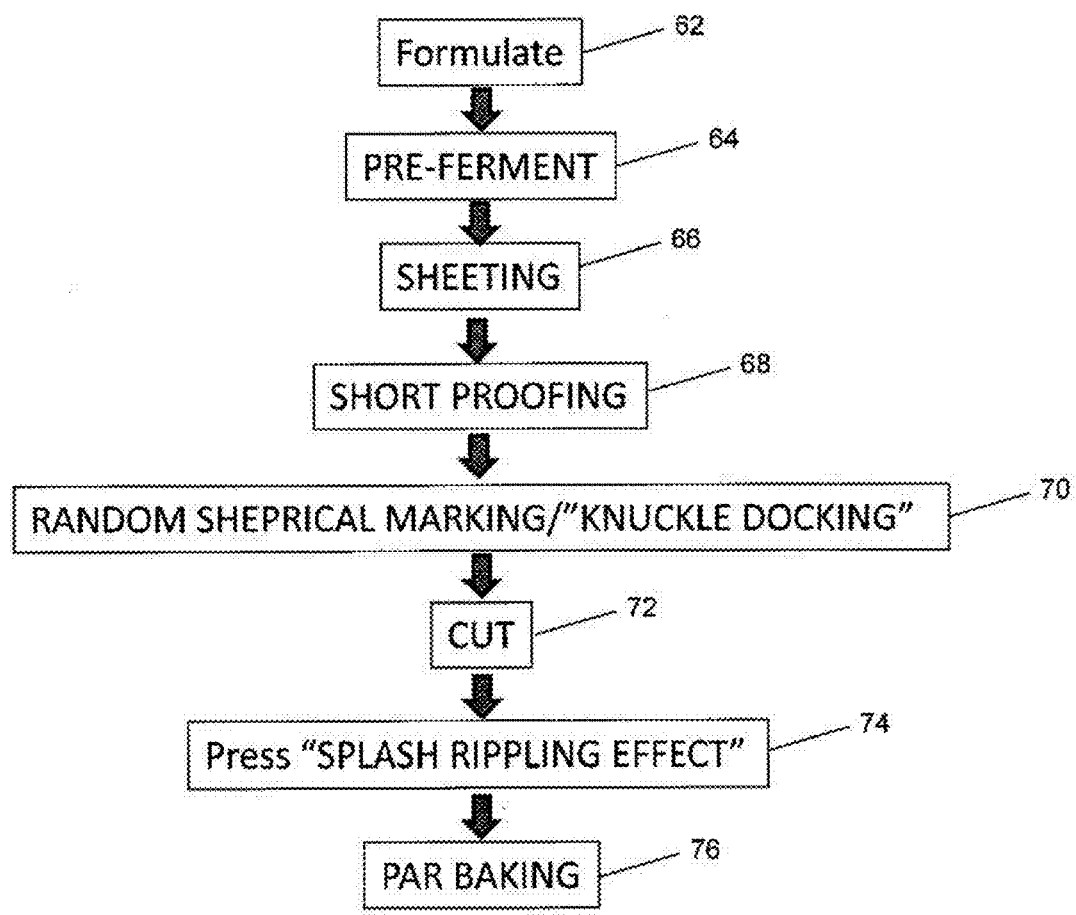
FIG. 20 is a flow chart illustrating an example method of making sheet dough in accordance with the principles of the present disclosure.

FIG. 20 is a flow chart illustrating an example method 60 of making an artisan-like pizza crust from a sheet or balled dough 24. In this example, the method includes operations 62, 64, 66, 68, 70, 72, 74, and 76.

The operation 62 is to formulate the sheet or balled dough 24 with our without pre-ferment. This operation is completed in a conventional manner known to one skilled in the art.

The operation 64 is to ferment the sheet or balled dough 24 in a conventional manner and allow the sheet or balled dough 24 to rest for building up flavor and enzyme activity.

The operation 66 is to form the sheet or balled dough 24 into sheet form in a conventional manner. The sheet or balled dough 24 is formed having a desired thickness to maintain gas pressure and bubbles.

The operation 68 is to provide a short proofing process in a conventional manner where the sheet or balled dough 24 is placed in a control cabinet to expand cells and continue the fermentation process.

The operation 70 is to apply random impressions or embossings 26 in the sheet or balled dough 24 using a knuckle docking device 10. The knuckle docking device 10 provides a randomized pattern in the sheet or balled dough 24 that varies from one sheet or balled dough 24 to another. An example of the knuckle docking device 10 is illustrated and described with reference to FIGS. 1-3 and 5.

The operation 72 is to cut the sheet or balled dough 24 to create an irregular shape using a cutting die 36. In this example, the cutting die 36 cuts the sheet or balled dough 24 continuously at a substantially constant rate conventional in high speed manufacturing processes. The cutting die 36 can be moved by a pneumatic cylinder assembly (not shown) between a first positioned spaced a distance above the sheet or balled dough 24 and a second position adjacent a top surface 46 of the sheet or balled dough 24. When in the second position, the cutting die 36 effectively engages the top surface 46 and cuts the sheet or balled dough 24 to a desired size. The pneumatic cylinder assembly may be arranged and configured in a conventional manner. It is appreciated that the cutting die 36 can be moved between the first and second positions using other methods known to those skilled in the art. An example of the cutting die 36 is illustrated and described with reference to FIGS. 6-10.

The operation 74 is to press the sheet or balled dough 24 within milliseconds of being cut using a pressure plate 34. Another pneumatic cylinder assembly (not shown) may be used to move the pressure plate 34 between a first position spaced above the sheet or balled dough 24 on the continuous conveyor, and a second position where it contacts and presses the sheet or balled dough 24 which forces the sheet or balled dough within a gap G between the cutting die 36 and the pressure plate 34. The pressing of the sheet or balled dough 24 is in a rapid manner causing the splash rippling effect which creates more irregularity in the sheet or balled dough 24 as described herein. An example of the pressure plate 34 is illustrated and described with reference to FIGS. 6 and 9-10.

The operation 76 is to par bake the sheet or balled dough 24 in a conventional manner. During this operation the irregularity of the sheet or balled dough 24 can be elevated to include even more randomness in structure. The sheet or balled dough 24 structure can be set by the par baking process as described herein.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

EXAMPLE

Figure 21:
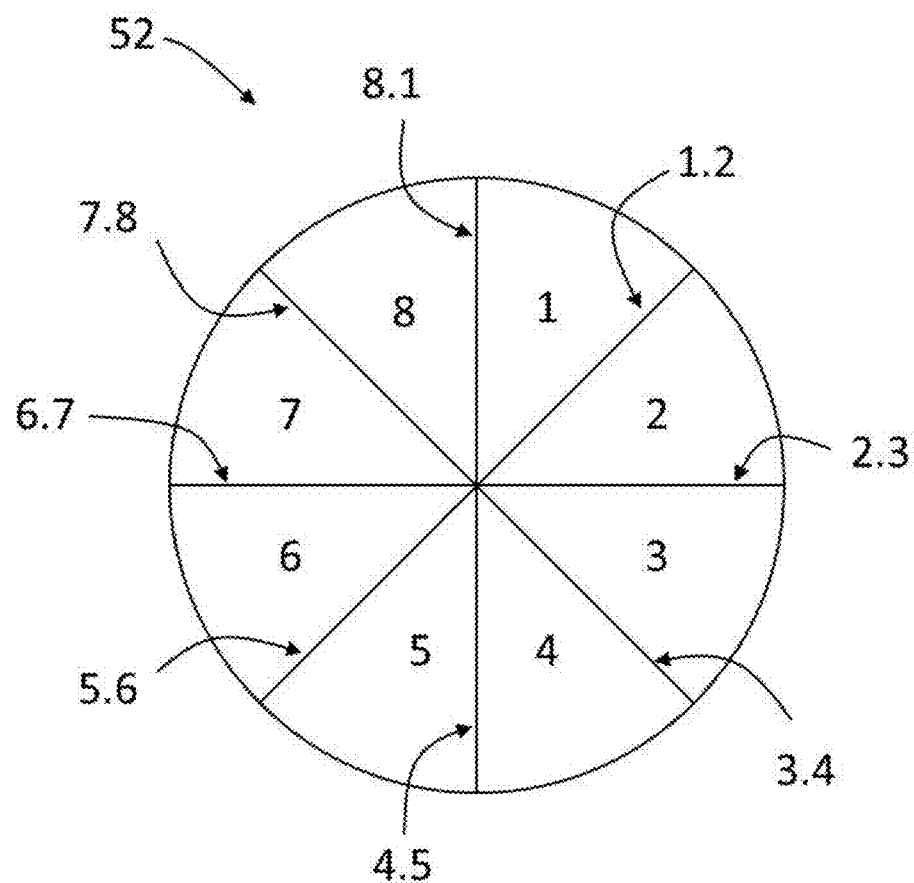
FIGS. 21A and 21B are schematic depictions of a crust in accordance with the principles of the present disclosure.
Figure 21:
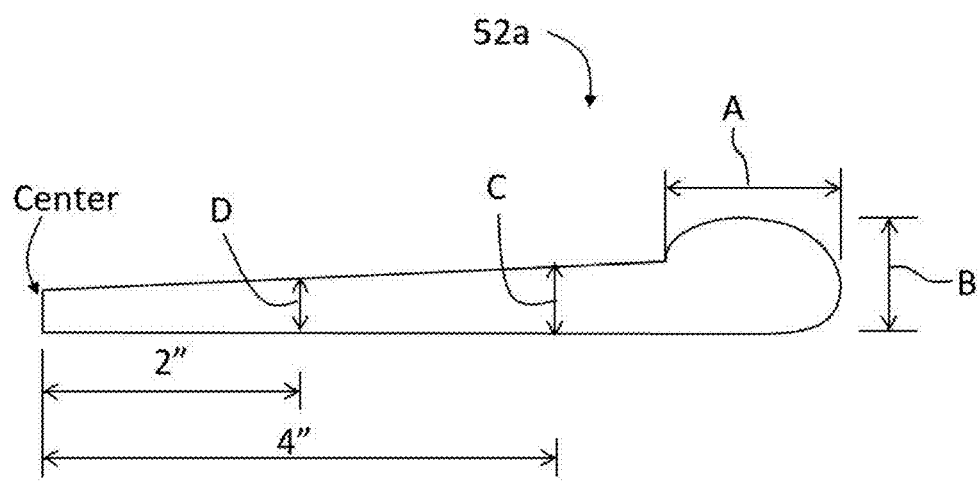
Figure 22A:
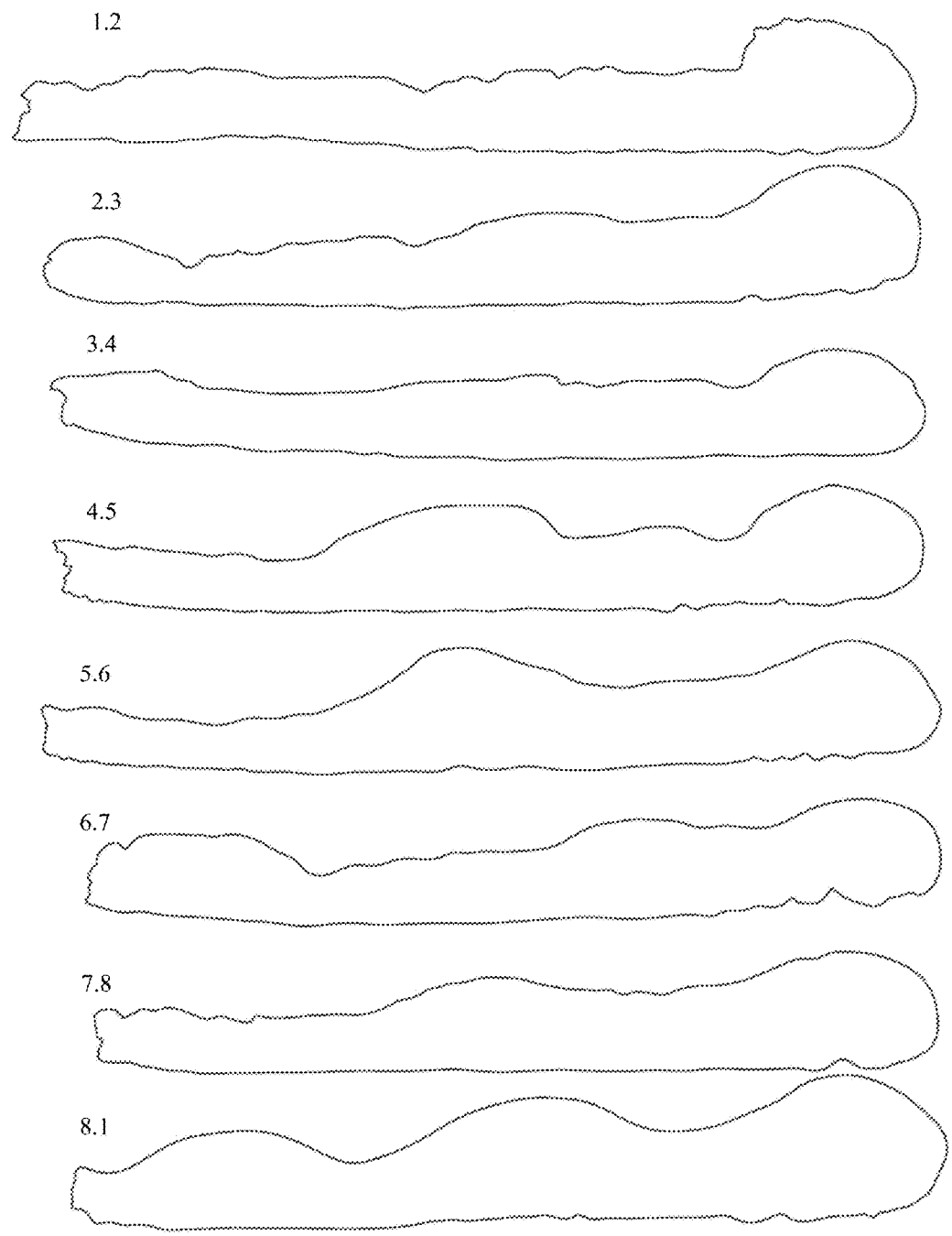
FIGS. 22A-22C are illustrations of a crust in accordance with the principles of the present disclosure.

Three pizza crusts 52 were prepared according to the method of the present disclosure. Each of the crusts was cut into eight sections 52a and the thickness of the sections was measured at three points to evaluate the variation in the thickness of the crust. A diagram of the sections is shown in FIG. 21A, with a schematic of the measuring points shown in FIG. 21B. The sections were numbered 1-8, and measurements were taken along the cutting lines, designated 1.2 (cutting line between sections 1 and 2), 2.3, 3.4, 4.5, 5.6, 6.7, 7.8, and 8.1. On each section, the width of the edge was measured at point A and the thickness of the crust was measured at points B (at the edge), C (four inches from the center), and D (two inches from the center). Drawn images of the sections are shown in FIGS. 22A (first crust), 22B (second crust), and 22C (third crust).

Results from the measurements are shown in TABLE 1 below. For each sample, the thickness measurements at points B-D of the sections were averaged together, and minimum and maximum values, standard deviation (SD), and %-difference for the minimum and maximum from the average value were calculated as shown.

TABLE 1

| | Variations in sample uniformity. | | | | | | | | | | | |
|---|---|---|---|---|---|---|---|---|---|---|---|---|
| | Sample 1 (inches) | | | | Sample 2 (inches) | | | | Sample 3 (inches) | | | |
| Section | A | B | C | D | A | B | C | D | A | B | C | D |
| 1.2 | 1.08 | 0.78 | 0.40 | 0.49 | 1.10 | 0.82 | 0.55 | 0.39 | 1.07 | 0.77 | 0.64 | 0.70 |
| 2.3 | 1.04 | 0.69 | 0.50 | 0.37 | 1.10 | 0.75 | 0.58 | 0.41 | 1.14 | 0.60 | 0.55 | 0.41 |
| 3.4 | 1.11 | 0.76 | 0.52 | 0.54 | 1.00 | 0.67 | 0.49 | 0.36 | 1.06 | 0.75 | 0.61 | 0.49 |
| 4.5 | 0.99 | 0.68 | 0.54 | 0.43 | 1.80 | 0.83 | 0.61 | 0.45 | 1.32 | 0.81 | 0.59 | 0.44 |
| 5.6 | 0.92 | 0.65 | 0.49 | 0.38 | 0.95 | 0.60 | 0.35 | 0.34 | 1.01 | 0.85 | 0.41 | 0.47 |
| 6.7 | 1.23 | 0.76 | 0.54 | 0.29 | 1.12 | 0.72 | 0.55 | 0.38 | 1.18 | 0.80 | 0.55 | 0.55 |
| 7.8 | 1.05 | 0.72 | 0.55 | 0.39 | 1.10 | 0.73 | 0.56 | 0.49 | 0.97 | 0.73 | 0.57 | 0.42 |
| 8.1 | 1.02 | 0.85 | 0.35 | 0.39 | 1.18 | 0.90 | 0.67 | 0.36 | 0.94 | 0.77 | 0.50 | 0.39 |
| Average | 1.06 | 0.54 | | | 1.17 | 0.57 | | | 1.09 | 0.60 | | |
| Min | 0.92 | 0.29 | | | 0.95 | 0.34 | | | 0.94 | 0.39 | | |
| Max | 1.23 | 0.85 | | | 1.80 | 0.90 | | | 1.32 | 0.85 | | |
| SD | 0.09 | 0.16 | | | 0.26 | 0.17 | | | 0.12 | 0.14 | | |
| SD (% of Ave) | 8.64 | 29.02 | | | 22.67 | 29.83 | | | 11.43 | 24.06 | | |
| diff min (%) | −12.8 | −46.7 | | | −18.7 | −39.8 | | | −13.5 | −34.9 | | |
| diff max (%) | 16.6 | 56.2 | | | 54.0 | 59.3 | | | 21.5 | 42.0 | | |

Figure 22B:
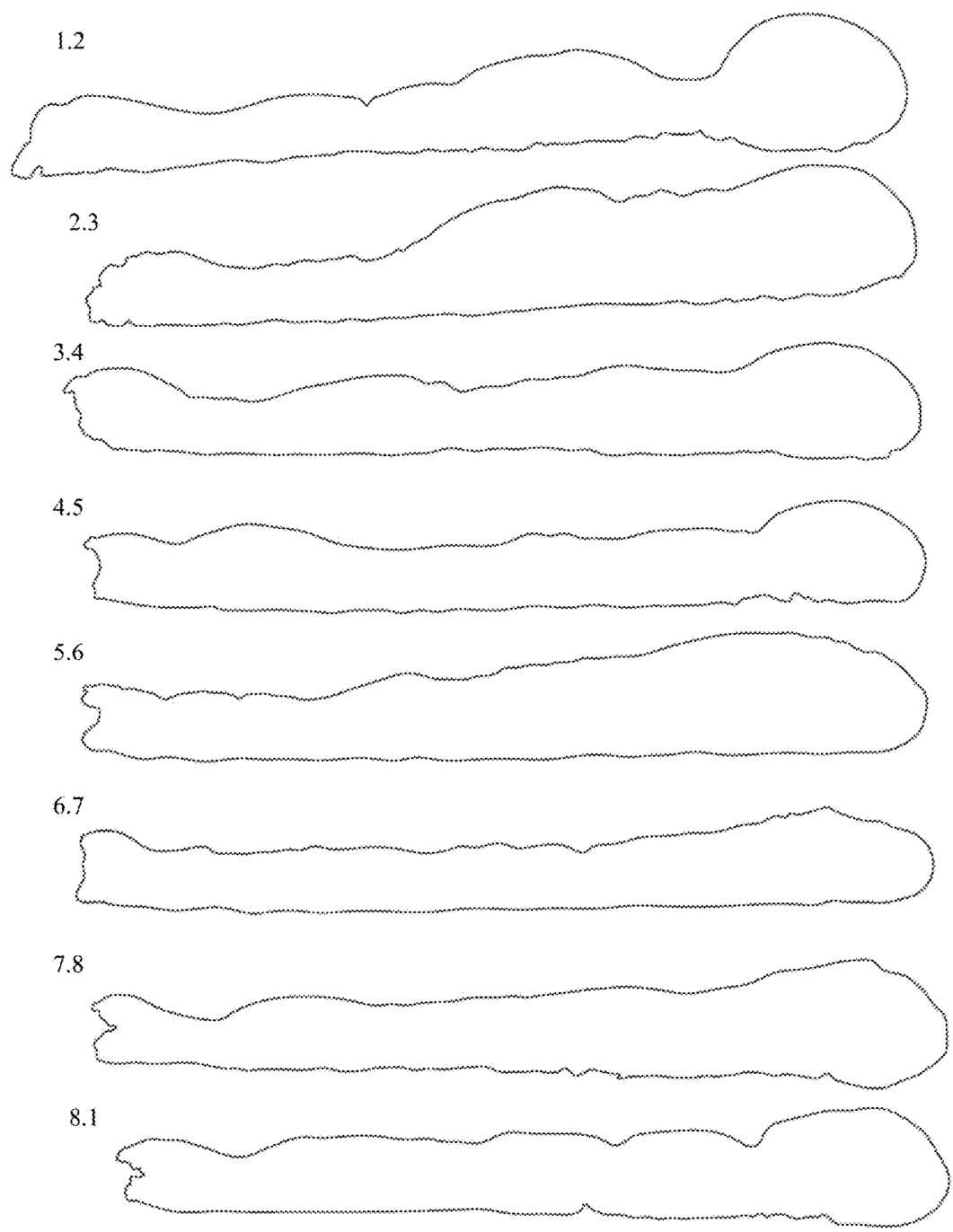
Figure 22C:
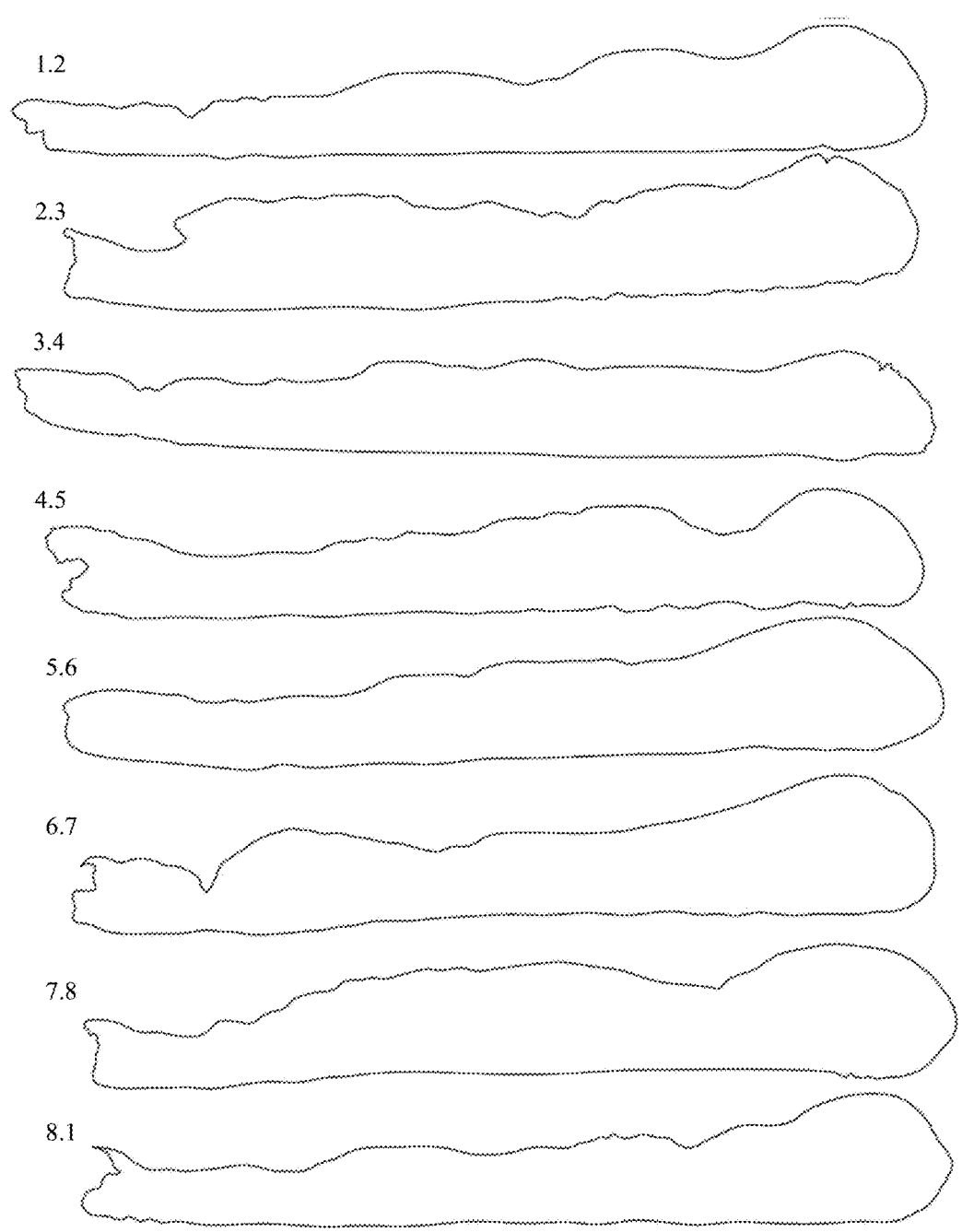

It was determined that differences between the thinnest ("Min") measurement and the average thickness varied from −34.9% to −46.7%. Differences between the thickest ("Max") measurement and the average thickness varied from +42.0% to +59.3%. The standard deviation of the thickness, expressed as percent of the average values, ranged from 24.06% to 29.83%. It was concluded that the present method is capable of producing pizza crusts with great variability within a given pizza crust and from one pizza crust to the next. As can be seen from FIGS. 22A-22C and the test results above, the variability is random, giving the pizza crusts an appearance of hand-made artisan crusts.

What is claimed is:

1. A method for making a sheet dough for a pizza product, the method comprising:
   sheeting a dough to form a sheet;
   embossing the sheet with a knuckle docking device, the knuckle docking device comprising:
   a plate or a drum having a first surface; and
   a plurality of protrusions mounted onto and extending from the first surface wherein the length of each protrusion varies independently,
   wherein embossing the sheet comprises engaging the sheet with a distal end of the plurality of protrusions;
   lowering a cutting die comprising an irregular-shaped perimeter to a cutting position on the embossed sheet such that the perimeter surrounds a cut sheet; and
   while maintaining the cutting die in the cutting position, lowering a pressure plate arranged within the perimeter of the cutting die and having an irregular-shaped perimeter such that the pressure plate engages the cut sheet,
   wherein the pressure plate and the perimeter of the cutting die define a gap and the width of the gap is not constant around the outside perimeter of the pressure plate, and while the cutting die is in the cutting position and the pressure plate is lowered to engage the cut sheet, a portion of the cut sheet is forced through the gap.

2. The method according to claim 1, further comprising par baking the pressed sheet.

3. The method according to claim 1, wherein the plurality of protrusions comprise posts mounted onto mounting apertures on the first surface.

4. The method according to claim 1, wherein the pressure plate has an outer perimeter that follows the perimeter of the cutting die.

5. The method according to claim 4, wherein the outer perimeter of the pressure plate and the perimeter of the cutter die are substantially parallel to one another.

6. The method according to claim 5, wherein the cutting die is positioned adjacent an outside perimeter of the pressure plate.

7. The method according to claim 1, wherein the pressure plate applies a pressure of about 200 psi to about 700 psi to the cut sheet.

8. The method according to claim 7, wherein the pressure plate applies a pressure for a duration of about 0.3 seconds to 0.7 seconds to the cut sheet.

9. The method according to claim 1, wherein the dough has a temperature between about 65° F. and 115° F. during the method.

10. The method according to claim 1, wherein the method is applied at ambient temperatures.

11. The method according to claim 1, wherein the gap between the perimeter of the cutting die and the pressure plate is between about 0.3 mm to 1.0 mm.

12. A method of making a sheet dough comprising:
    formulating a dough;
    sheeting the dough to form a sheet;
    proofing the sheeted dough;
    applying random embossings to the proofed sheeted dough using a knuckle docking device, the knuckle docking device comprising knuckles of various lengths and diameters protruding from a surface of the knuckle docking device,
    wherein applying random embossings to the proofed sheeted dough comprises engaging the sheet with a distal end of the knuckles;
    cutting the dough to form an irregular shaped edge by lowering a cutting die having a perimeter with an irregular peripheral cutting pattern to a cutting position on the embossed sheet such that the perimeter surrounds a cut sheet;
    while maintaining the cutting die in the cutting position, pressing the dough by lowering a pressure plate to engage the cut sheet, the pressure plate having a perimeter that approximately follows the peripheral cutting pattern of the cutting die, and a first zone and a second zone to create a pressed dough having a first thickness in a center part of the pressed dough and a second thickness at an edge of the pressed dough, the first thickness being smaller than the second thickness; and
    par baking the pressed dough.

13. The method according to claim 12, wherein the perimeter of the pressure plate is approximately parallel to the peripheral cutting pattern of the cutting die.

14. The method according to claim 12, wherein the second zone has a surface with a slope angle between about 1.0-5.0 degrees.

15. The method according to claim 12, wherein the first zone has a width between about 3.0 inches to 15 inches.

16. The method of claim 1, wherein cutting the embossed sheet comprises lowering the cutting die to a cutting position, and wherein the cutting die is maintained in the cutting position while the pressure plate is lowered into a pressing position.

17. The method of claim 1, wherein pressing the embossed sheet randomizes an internal structure of the cut sheet by creating a splash rippling effect in the internal structure.

18. The method of claim 17, wherein the splash rippling effect forces portions of the sheet into the gap area forming a built-up crust edge and thinner center dough layer.

19. A method for making a dough-based food product, the method comprising:
    forming a dough;
    sheeting the dough to form a sheet;
    embossing the sheet with a first press assembly, the first press assembly comprising a plurality of protrusions mounted onto and extending from a surface of the first press assembly wherein the length of each protrusion varies independently,
    wherein embossing the sheet comprises engaging the sheet with a distal end of the plurality of protrusions; and
    lowering a cutting die comprising a perimeter to a cutting position on the embossed sheet such that the perimeter surrounds a cut sheet; and
    within seconds after cutting and while maintaining the cutting die in the cutting position, lowering a press plate arranged within the perimeter of the cutting die and having an irregular-shaped perimeter such that the pressure plate engages the cut sheet,
    wherein the press plate and the perimeter of the cutting die define a gap, and while the cutting die is in the cutting position and the pressure plate is lowered to engage the cut sheet, a portion of the cut sheet is forced through the gap.

20. The method of claim 1, wherein the knuckle docking device comprises a plate, and wherein embossing the sheet comprises:
   lowering the plate so that the distal end of the plurality of protrusions engages the sheet; and
   raising the plate to disengage the plurality of protrusions from the sheet.

21. The method of claim 1, wherein the knuckle docking device comprises a drum, and wherein embossing the sheet comprises:
   rolling the drum over the sheet so that the distal end of the plurality of protrusions engages the sheet.

22. The method of claim 2, wherein the method is an automated high-speed manufacturing process.

23. The method of claim 22, wherein the thickness of the par baked crust varies between about 10% to about 90% of the average thickness of the crust.

24. The method of claim 22, wherein the width of the par baked crust varies from about 5% to about 70% of the average width of the crust.

\* \* \* \* \*